(12) United States Patent
Oka et al.

(10) Patent No.: US 7,630,036 B2
(45) Date of Patent: Dec. 8, 2009

(54) LIQUID CRYSTAL DISPLAY

(75) Inventors: Shinichiro Oka, Hitachi (JP); Masaya Adachi, Hitachi (JP); Shinichi Komura, Mobara (JP)

(73) Assignee: Hitachi Displays, Ltd., Chiba (JP)

( * ) Notice: Subject to any disclaimer, the term of this patent is extended or adjusted under 35 U.S.C. 154(b) by 248 days.

(21) Appl. No.: 11/600,858

(22) Filed: Nov. 17, 2006

(65) Prior Publication Data

US 2007/0115409 A1    May 24, 2007

(30) Foreign Application Priority Data

Nov. 18, 2005   (JP) .............................. 2005-333513

(51) Int. Cl.
*G02F 1/1343* (2006.01)
(52) U.S. Cl. ...................... 349/114; 349/144
(58) Field of Classification Search ........................ None
See application file for complete search history.

(56) References Cited

U.S. PATENT DOCUMENTS

| | | | |
|---|---|---|---|
| 4,840,460 A * | 6/1989 | Bernot et al. ............... | 349/144 |
| 5,576,863 A * | 11/1996 | Aoki et al. ................... | 349/124 |
| 2004/0165129 A1* | 8/2004 | Okumura ..................... | 349/114 |
| 2005/0036088 A1* | 2/2005 | Okumura ..................... | 349/114 |
| 2005/0168423 A1* | 8/2005 | Hirata et al. .................. | 345/88 |
| 2005/0179852 A1* | 8/2005 | Kawai ......................... | 349/153 |
| 2006/0267891 A1* | 11/2006 | Nishimura et al. ............ | 345/87 |

FOREIGN PATENT DOCUMENTS

| JP | 2000-187220 | 7/2000 |
|---|---|---|
| JP | 2004-038165 | 2/2004 |
| JP | 2005-292397 A * | 10/2005 |

* cited by examiner

*Primary Examiner*—Mike Stahl
(74) *Attorney, Agent, or Firm*—Antonelli, Terry, Stout & Kraus, LLP.

(57) ABSTRACT

A liquid crystal display having a plurality of pixels includes a liquid crystal layer disposed between first and second substrates, and first and second polarization plates disposed on the side opposite to the side where the liquid crystal layer is disposed with respect to the first and second substrates. The second substrate includes a pixel electrode on the side of the liquid crystal layer. Each of the plurality of pixels includes a reflection area and a transmission area. A ratio of the common electrode occupying the aperture in the reflection area is smaller than a ratio of the common electrode occupying the aperture of the transmission area.

16 Claims, 20 Drawing Sheets

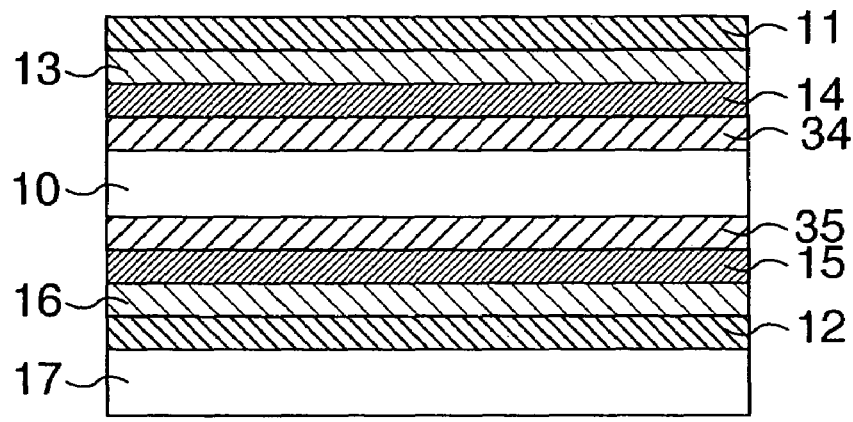
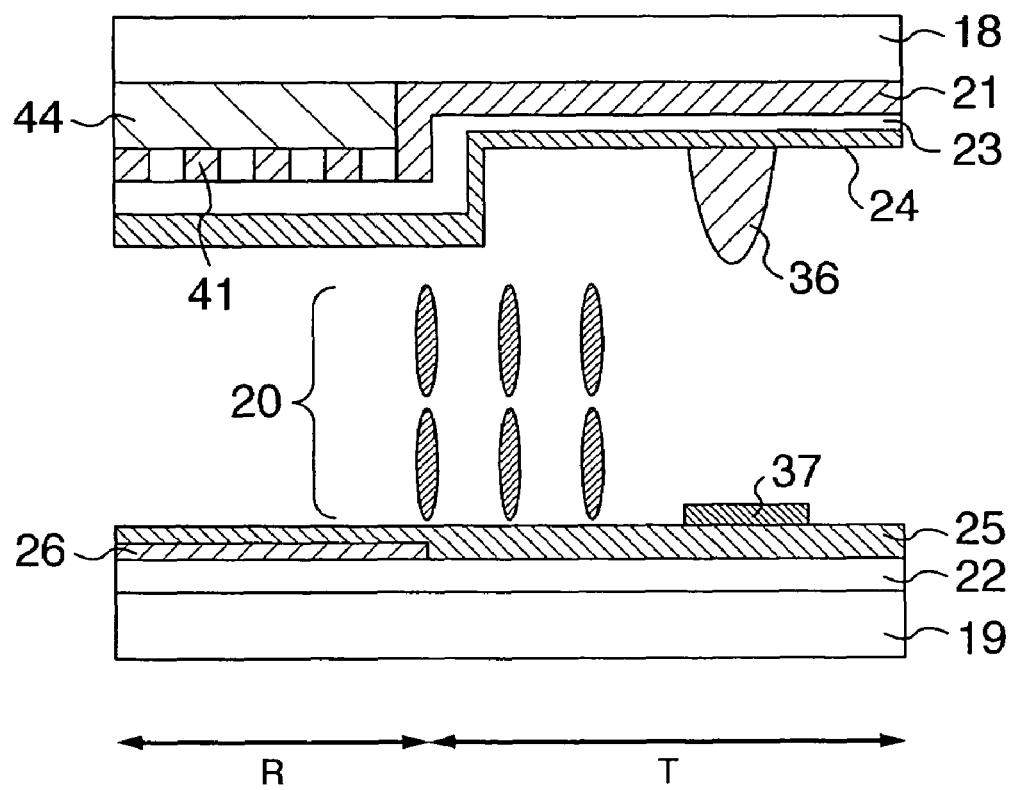

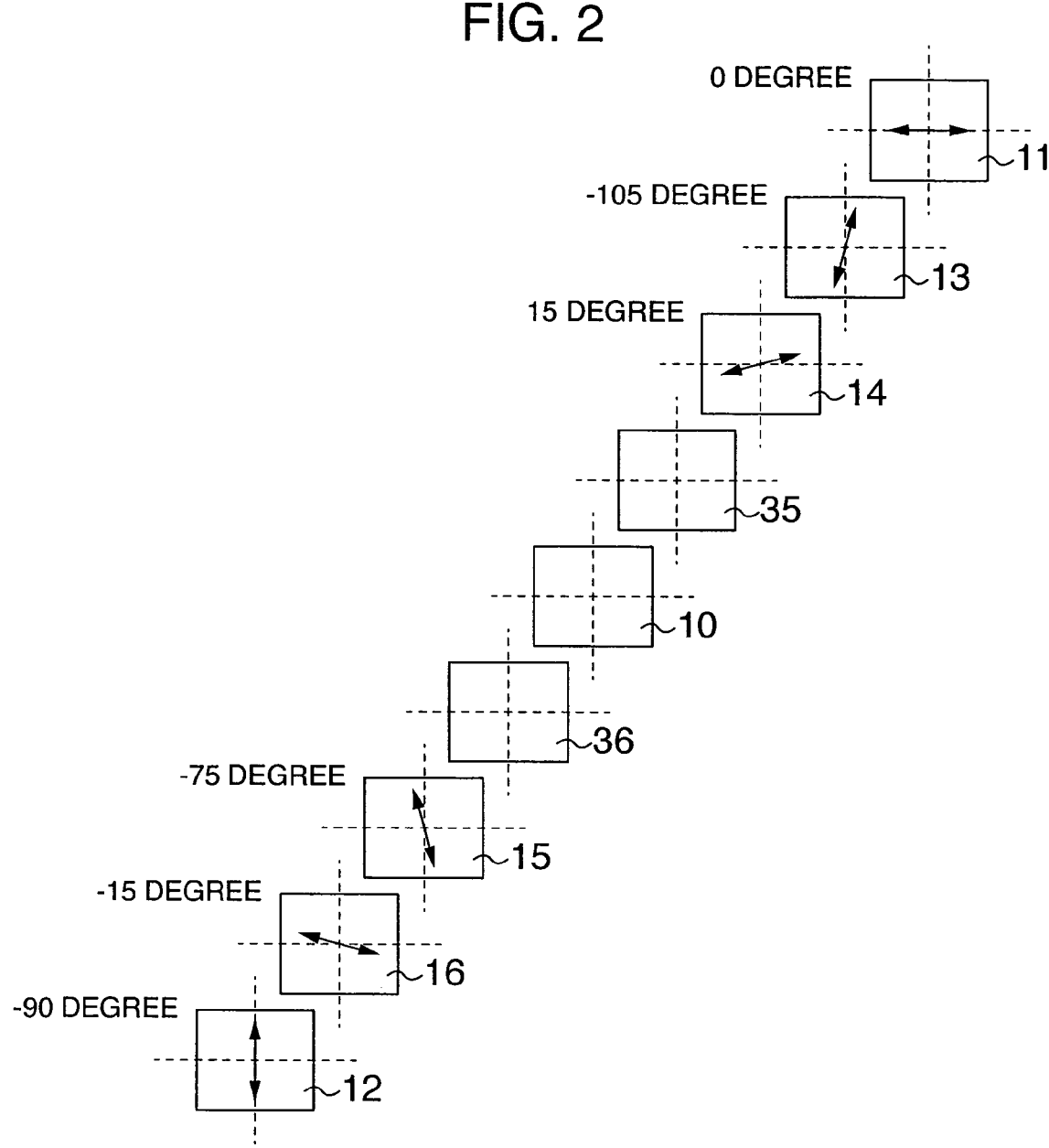

LIQUID CRYSTAL DISPLAY

BACKGROUND OF THE INVENTION

The present invention relates to a liquid crystal display and more particularly to a transflective liquid crystal display.

A liquid crystal display is a non-light-emitting type display that displays a picture by adjusting an amount of transmitted light differently from a self-light-emitting type display represented by a cathode ray tube (CRT) and a plasma display panel (PDP). The liquid crystal display is characterized by thinness, light weight and low power consumption.

As the liquid crystal display, there are a transmissive liquid crystal display that has a light source (hereinafter referred to as backlight) disposed at the back thereof and can adjust an amount of transmitted light from the light source to display a picture and a reflection liquid crystal display that utilizes external light such as indoor illumination and sunlight and makes the external light enter the display from the surface thereof so that an amount of reflected light of the external light can be adjusted to display a picture. Furthermore, there is a liquid crystal display (hereinafter referred to as transflective liquid crystal display) that can be used as a reflection liquid crystal display in light surroundings and be used as a transmissive liquid crystal display in dark surroundings. The transflective liquid crystal display has the reflection type and transmission type display functions and can put off the backlight in light surroundings to thereby reduce the power consumption. In addition, the backlight can be turned on to thereby obtain the visibility in dark surroundings. That is, the transflective liquid crystal displays are suitable for liquid crystal displays used in portable apparatuses such as portable telephones and digital cameras supposed to be used in various surroundings.

The transflective liquid crystal display is required to arrange a transmission area and a reflection area in a pixel independently and design respective retardations in the transmission and reflection areas optimally as described in JP-A-2000-187220. This requirement is achieved by providing a step in the reflection area and reducing the thickness of a liquid crystal layer in the reflection area to about half of that in the transmission layer.

Further, in the transmissive liquid crystal display of the vertical alignment (hereinafter abbreviated to VA) system, as described in JP-A-2004-38165, the pixel is divided into two areas to make the two areas have different electro-optical characteristics, so that the γ-shift in case where the display is observed from the oblique direction is reduced. The γ characteristic is expressed by a numerical value representing the gradation or gray scale characteristic and when the numerical value is different in the observation direction, it is shown that the gradation is different depending on the observation direction.

SUMMARY OF THE INVENTION

As described above, the transflective liquid crystal display can obtain satisfactory visibility in various surroundings of illumination. However, in order to optimize the retardations in the transmission area and the reflection area, it is necessary to provide the step structure in the reflection area. There arises a problem that the step structure reduces an effective area in the pixel and the contrast ratio or the aperture ratio is further reduced due to disturbance in alignment of the liquid crystal caused by the step structure.

Moreover, in the transmissive liquid crystal display of the VA system, since the pixel is divided into two parts or areas for the purpose of reduction in the γ-shift to make the two areas have different electro-optical characteristics, it is necessary to provide a new pixel capacity or new thin film transistor (TFT) and accordingly there is a problem that the aperture ratio is reduced and the cost is increased.

It is an object of the present invention to provide a liquid crystal display capable of displaying a picture with high picture quality without complicating pixel structure in one pixel while suppressing reduction in the aperture ratio.

In order to solve the above problems, according to the present invention, the liquid crystal display including a plurality of pixels, comprises a liquid crystal layer disposed between first and second substrates, a first polarization plate disposed on the side opposite to the side where the liquid crystal layer is disposed with respect to the first substrate, and a second polarization plate disposed on the side opposite to the side where the liquid crystal layer is disposed with respect to the second substrate. The second substrate includes a pixel electrode on the side of the liquid crystal layer and the first substrate includes a common electrode on the side of the liquid crystal layer. Each of the plurality of pixels includes a reflection area and a transmission area. A ratio of the common electrode occupying an aperture in the transmission area is different from a ratio of the common electrode occupying an aperture in the reflection area in a plane of one pixel and the ratio of the common electrode occupying the aperture in the reflection area is equal to or larger than 0% and smaller than 100%.

Further, in the transflective liquid crystal display having the same structure as above, the ratio of the pixel electrode occupying the aperture in the transmission area is different from the ratio of the pixel electrode occupying the aperture in the transmission area in the plane of one pixel and the ratio of the common electrode occupying the aperture in the reflection area is equal to or larger than 0% and smaller than 100%.

Moreover, in the transflective liquid crystal display having the same structure as above, the ratio of the common electrode occupying the aperture in the transmission area is different from the ratio of the common electrode occupying the aperture in the reflection area in the plane of one pixel and the ratio of the common electrode occupying the aperture in the reflection area is equal to or larger than 0% and smaller than 100%. The ratio of the pixel electrode occupying the aperture in the transmission area is different from the ratio of the pixel electrode occupying the aperture in the reflection area in the plane of one pixel and the ratio of the pixel electrode occupying the aperture in the reflection area is equal to or larger than 0% and smaller than 100%.

Furthermore, according to the present invention, the liquid crystal display including a plurality of pixels, comprises a liquid crystal layer disposed between first and second substrates, a first polarization plate disposed on the side opposite to the side where the liquid crystal layer is disposed with respect to the first substrate, and a second polarization plate disposed on the side opposite to the side where the-liquid crystal layer is disposed with respect to the second substrate. The second substrate includes a pixel electrode on the side of the liquid crystal layer and the first substrate includes a common electrode on the side of the liquid crystal layer. Each of the plurality of pixels includes a first sub-pixel and a second sub-pixel. The ratio of the common electrode occupying the aperture in the first sub-pixel is different from the ratio of the common electrode occupying the aperture in the second sub-pixel in a plane of one pixel and the ratio of the common electrode occupying the aperture in the first sub-pixel is equal to or larger than 0% and smaller than 100%.

Further, in the transflective liquid crystal display having the same structure as above, a ratio of the pixel electrode occupying an aperture in the first sub-pixel is different from a ratio of the pixel electrode occupying an aperture in the second sub-pixel in the plane of one pixel and the ratio of the pixel electrode occupying the aperture in the first sub-pixel is equal to or larger than 0% and smaller than 100%.

Furthermore, in the transflective liquid crystal display having the same structure as above, the ratio of the common electrode occupying the aperture in the first sub-pixel is different from the ratio of the common electrode occupying the aperture in the second sub-pixel in the plane of one pixel and the ratio of the common electrode occupying the aperture in the first sub-pixel is equal to or larger than 0% and smaller than 100%. The ratio of the pixel electrode occupying the aperture in the first sub-pixel is different from the ratio of the pixel electrode occupying the aperture in the second sub-pixel in the plane of one pixel and the ratio of the pixel electrode occupying the aperture in the first sub-pixel is equal to or larger than 0% and smaller than 100%.

There can be provided the liquid crystal display capable of displaying a picture with high picture quality without complicating the pixel structure in one pixel while suppressing reduction in the aperture ratio.

Other objects, features and advantages of the invention will become apparent from the following description of the embodiments of the invention taken in conjunction with the accompanying drawings.

BRIEF DESCRIPTION OF THE DRAWINGS

FIG. 1 is a sectional view showing an embodiment of a liquid crystal display according to the present invention;

FIG. 2 is a diagram showing the relation of retardation films and optical axes of polarization plates in FIG. 1;

FIG. 3 is a sectional view showing an embodiment of a liquid crystal cell in FIG. 1;

DESCRIPTION OF THE EMBODIMENTS

Figure 4:
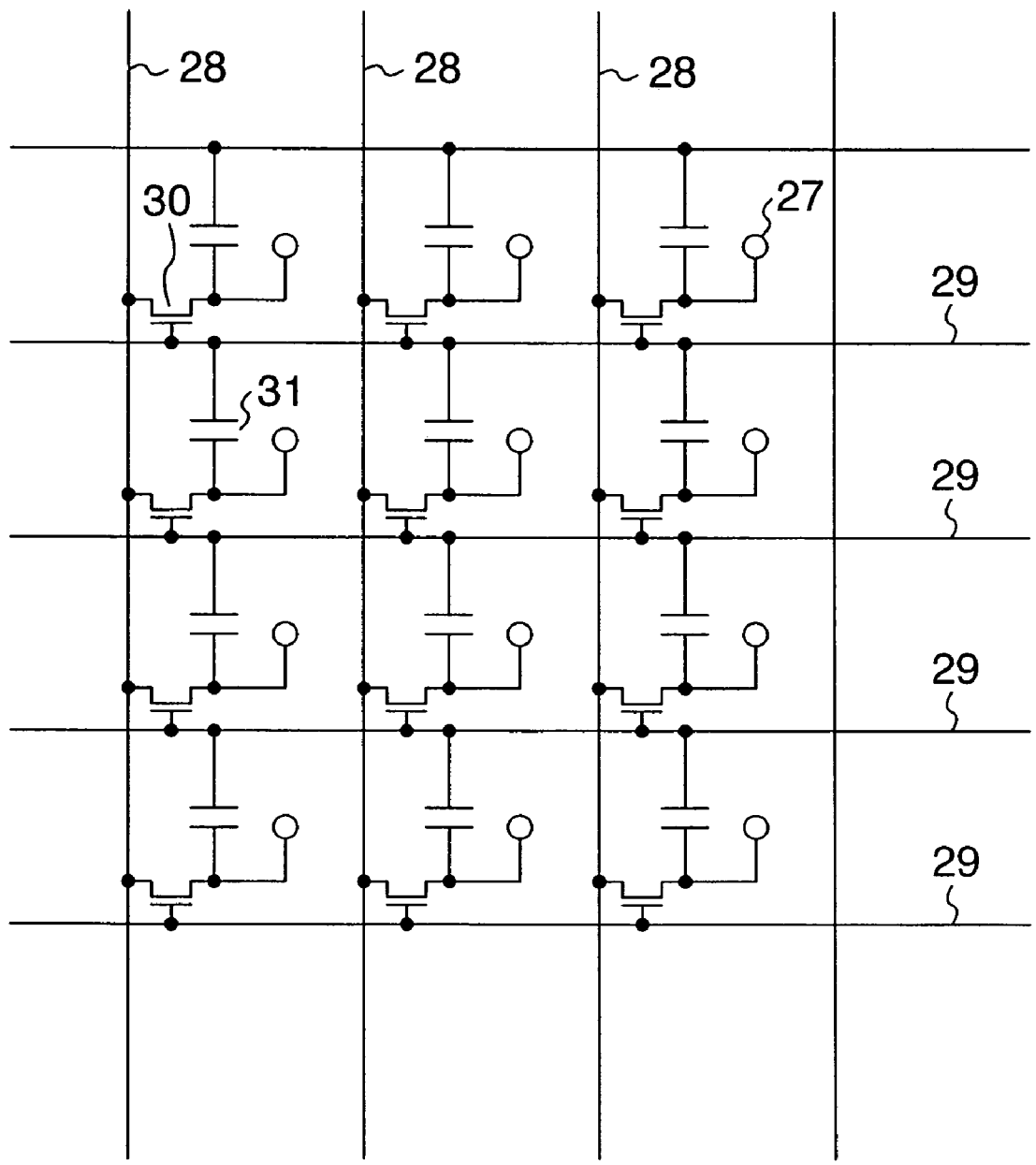
FIG. 4 is an equivalent circuit diagram showing a pixel display area in FIG. 1.

Embodiments of the present invention are described with reference to the accompanying drawings.

Embodiment 1

The embodiment is now described with reference to the drawings. A liquid crystal display of the embodiment constitutes a transflective liquid crystal display of the VA system in which liquid crystal molecules are aligned vertically to a substrate upon no application of voltage and aligned substantially horizontally to the substrate upon application of voltage and in such a liquid crystal display a ratio of a common electrode 21 occupying an aperture in a transmission area is different from that in a reflection area and the ratio of the common electrode 21 occupying the aperture in the reflection area is equal to or larger than 0% and smaller than 100%. By using this liquid crystal display, the ratio $d_R/d_T$ of the thickness $d_R$ of the reflection area and the thickness $d_T$ of the transmission area can be made equal to or larger than 0.5 and smaller than or equal to 1. Consequently, the aperture ratio can be improved and the cost can be reduced since the production process can be decreased.

Further, the ratio of the electrode occupying the aperture in the reflection area is made smaller than that in the transmission area. Consequently, a difference can be produced between effective voltages applied to liquid crystal layers in the aperture areas in the transmission area and the reflection area. That is, the effective voltage applied to the liquid crystal layer in the reflection area can be reduced to thereby reduce the in-plane retardation of the liquid crystal layer in the reflection area to half of that in the transmission area. Accordingly, the step in the reflection area in the above problems can be eliminated to attain the stepless transflective liquid crystal display.

Moreover, since sub-pixels can be structured in the same manner, the $\gamma$ characteristic can be also improved in the liquid crystal display of the VA system.

The aperture described here is defined to be an area transmitting light for the transmission area and an area reflecting light for the reflection area in one pixel.

FIG. 1 is a sectional view showing the liquid crystal display of the embodiment.

The liquid crystal display of the embodiment is constituted by a liquid crystal panel having a pair of polarization plates and a backlight. More particularly, the liquid crystal panel includes a liquid crystal cell 10 disposed between first and second polarization plates 11 and 12. First and second retardation films 13, 14 and a first negative C-plate 34 are disposed between the first polarization plate 11 and the liquid crystal cell 10. A second negative C-plate 35 and third and fourth retardation films 15, 16 are disposed between the second polarization plate 12 and the liquid crystal cell 10. Further, a backlight unit 17 is disposed on the opposite side to the liquid crystal cell 10 of the second polarization plate 12.

The first and second polarization plates 11 and 12 are constituted by a polyvinyl alcohol (hereinafter abbreviated to PVA) layer formed by making iodine be absorbed and stretched and a protection film for protecting the PVA layer. In order to attain normally-closed state, absorption axes of the first and second polarization plates 11, 12 are arranged substantially vertically.

Further, the phase difference between the first and fourth retardation films 13 and 16 is set to ½ wavelength and the first and fourth retardation films 13 and 16 are made of polycarbonate or norbornene resin.

Furthermore, the phase difference between the second and third retardation films 14 and 15 is set to ¼ wavelength and the second and third retardation films are made of polycarbonate or norbornene resin.

The combination of the first and second retardation films 13, 14 and the combination of the third and fourth retardation films 15, 16 can attain a broadband ¼-wavelength plate having small dependence on wavelength.

Further, the first and second negative C-plates 34 and 35 are disposed in order to reduce leakage of light when the display is observed from the oblique direction upon displaying black. The first and second negative C-plates 34 and 35 can be made of cellulose acylate class such as cellulose acetate and cellulose acetate butylate, polycarbonate, polyolefin, polystyrene, polyester or the like. Synthetically considered, cellulose acylate class is desirable and particularly cellulose acetate is desirable. It is desirable that the retardations Rth in the thickness direction of the first and second negative C-plates are substantially equal to each other. The retardation Rth is defined by the following expression (1):

$$Rth = \left[\frac{n_x + n_y}{2} - n_z\right] \cdot d \qquad (1)$$

where $n_x$, $n_y$ and $n_z$ represent refractive indexes in the major-axis direction of a refractive-index ellipsoid, $n_x$ and $n_y$ refractive indexes in the in-plane direction thereof and $n_z$, a refractive index in the thickness direction thereof. Further, d represents thickness of the retardation film.

The negative C-plates have the in-plane refractive index that is approximately isotropic and have the smaller refractive index in the thickness direction as compared with that in the in-plane direction.

The backlight unit 17 includes light emitting diodes (LED) constituting light sources, optical waveguide and diffuser. The light emitting diodes desirably emits white light but may be LED emitting three-color light of red, green and blue (RGB). Further, the backlight unit 17 may be of any structure as far as it can illuminate the liquid crystal cells from the back thereof and the light sources and the structure thereof are not limited to the above. For example, even if CCFL is used as the light sources, the effects of the present invention can be attained.

FIG. 2 is a schematic diagram showing the relation of retardation films and optical axes of polarization plates according to the liquid crystal display of the embodiment.

In order to achieve broadband circular polarization plates, it is necessary to dispose the retardation films as shown in FIG. 2.

Delay phase axes of the first and fourth retardation films 13 and 16 are substantially orthogonal to each other and slow axis of the second and third retardation films 14 and 15 are also substantially orthogonal to each other. Further, the relation of the absorption axes of the first and second polarization plates 11, 12 and the slow axis of the first to fourth retardation films is set so that, when the absorption axis of the first polarization plate 11 is set to 0 degree, the slow axis of the first, second, third and fourth retardation films 13, 14, 15 and 16 are −105, 15, −75 and −15 degrees, respectively, and the absorption axis of the second polarization plate 12 is −90 degrees.

Further, the arrangement of the retardation films shown is an example and is not limited to the above arrangement.

Figure 5:
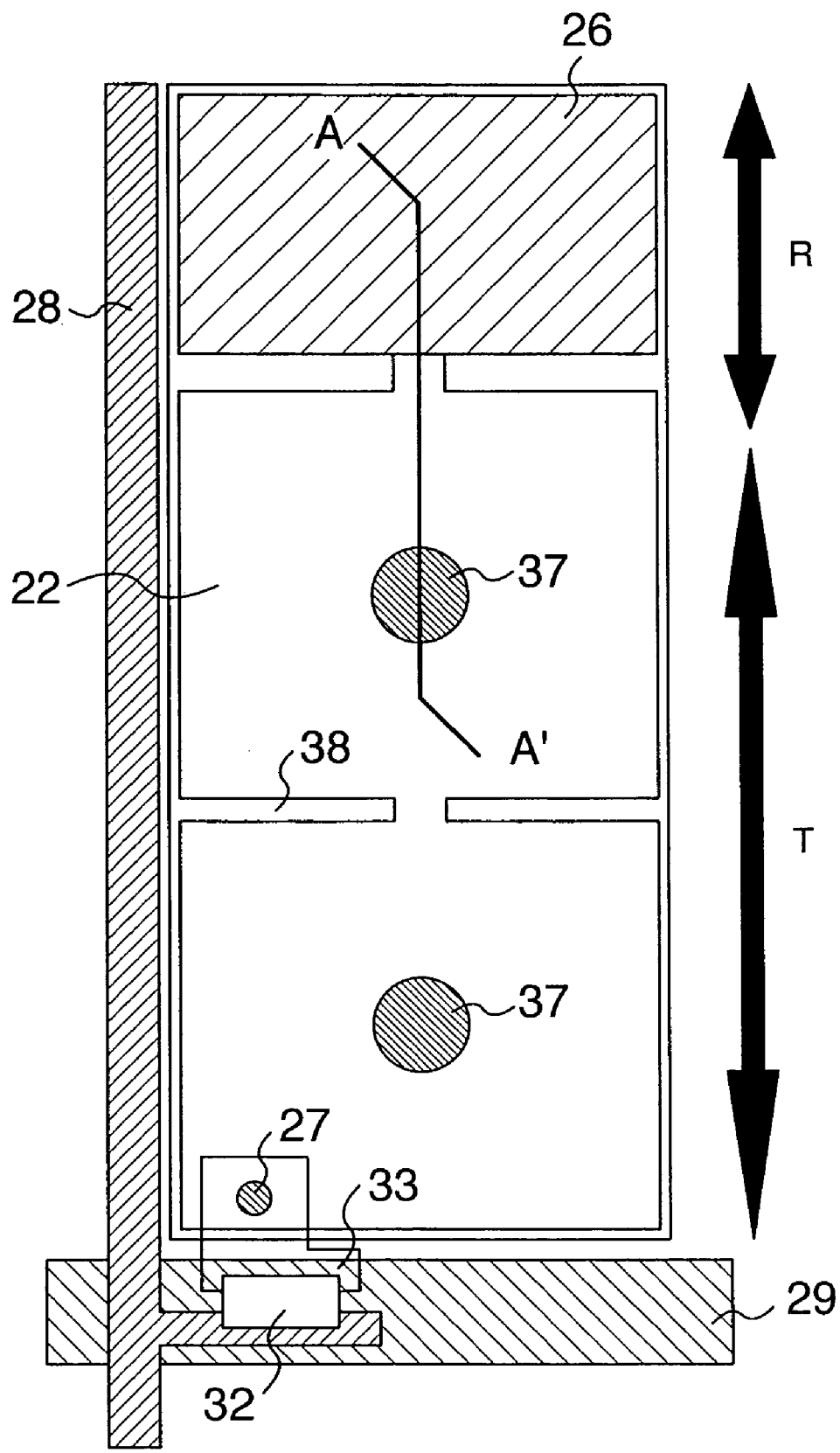
FIG. 5 is a plan view showing an example of a pixel on a second substrate in FIG. 3.
Figure 6:
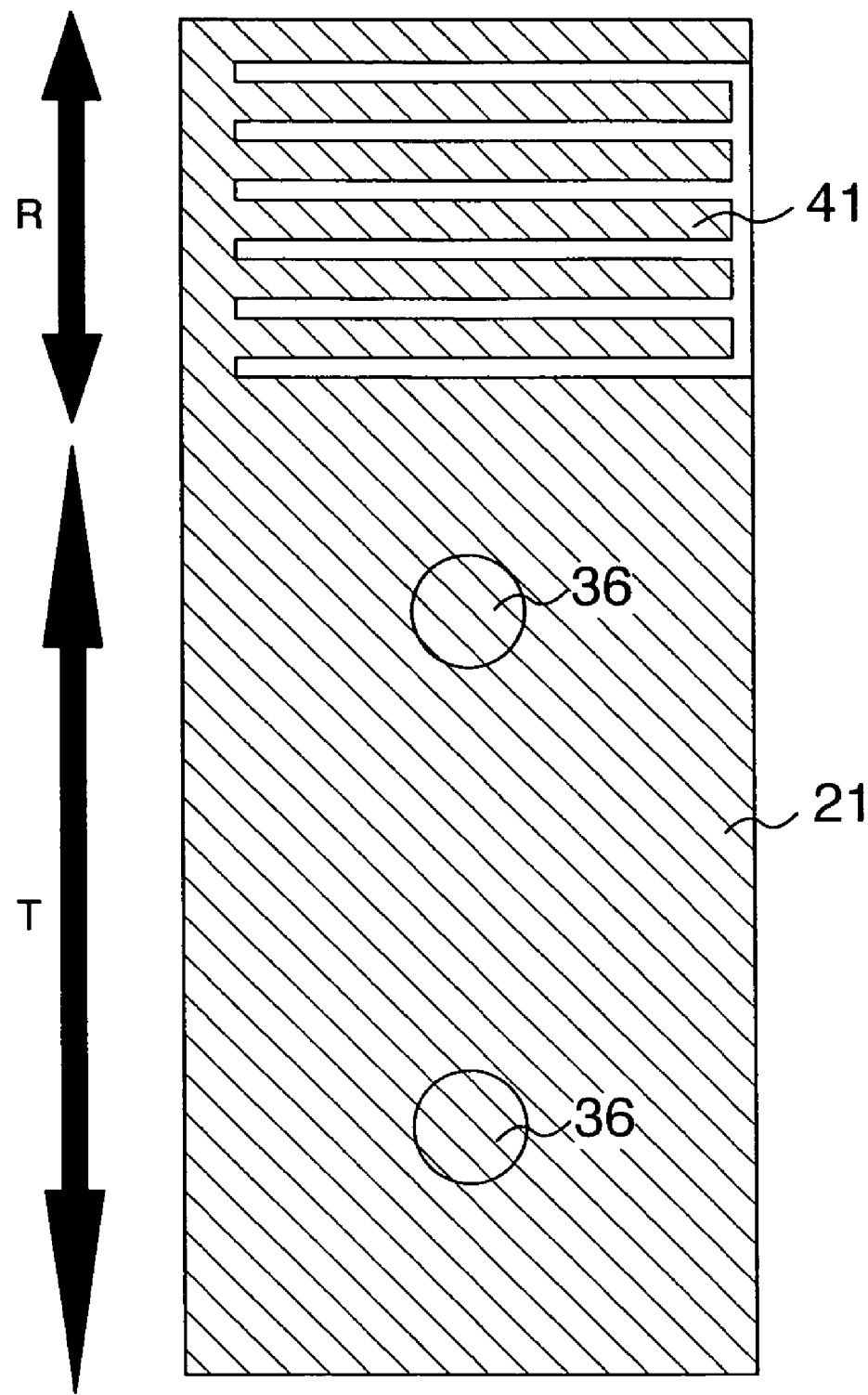
FIG. 6 is a plan view showing an example of a pixel on a first substrate in FIG. 3.

FIG. 3 is a sectional view showing the liquid crystal cell 10 of FIG. 1 taken along line A-A' of FIG. 5 and line of FIG. 6 corresponding to line A-A' of FIG. 5.

The transflective liquid crystal display of the embodiment includes a transmission area (T part of FIG. 3) and a reflection area (R part of FIG. 3) in one pixel. The liquid crystal cell 10 includes a first substrate 18, a liquid crystal layer 20 and a second substrate 19. The liquid crystal layer 20 is disposed between the first and second substrates 18 and 19. The first substrate 18 includes a color filter 23, a common electrode 21 and a first alignment film 24 on the side of the liquid crystal layer 20 of the first substrate 18, and the second substrate 19 includes a pixel electrode 22 and a second alignment film 25 on the side of the liquid crystal layer 20 of the second substrate 19. That is, a common electrode 21, a color filter 23 and a first alignment film 24 are disposed adjacent to the first substrate 18 on the side of the liquid crystal layer 20 of the first substrate 18, and a pixel electrode 22 and a second alignment film 25 are disposed adjacent to the second substrate 19 on the side of the liquid crystal layer 20 of the second substrate 19. A reflecting plate 26 is disposed in the reflection area on the side of the liquid crystal layer 20 of the second substrate 19. A protrusion 36 for controlling alignment is disposed on the side of the liquid crystal layer 20 of the common electrode 21. Further, a light shielding part or black matrix 37 is disposed on the side of the liquid crystal layer 20 of the second substrate 19 and a step 44 is disposed in an area corresponding to the reflection area on the side of liquid crystal layer 20 of the first substrate 18.

Further, the first and second substrates 18 and 19 are transparent so that the substrates transmit light and can be made of glass or high-molecular film, for example. The high-molecular film is desirably plastic and polyether sulphone (hereinafter abbreviated to PES). However, since air penetrates plastic and PES, it is necessary to form a gas barrier on the surface of the substrate. The gas barrier is desirably formed of film of silicon nitride.

The liquid crystal layer 20 is constituted by a liquid crystal composition showing the negative dielectric isotropy having the dielectric constant in the major-axis direction of the liquid crystal molecules smaller than that in the minor-axis direction. As liquid crystal material of the liquid crystal layer 20, material showing the nematic phase in the wide range containing the room temperature area is used. Further, material showing the high electrical resistivity with which the transmission factor is sufficiently held during the hold time and flicker is not produced in driving conditions using thin film transistors (TFT), for example in the resolution of QVGA (the number of lines is 240) and the driving frequency of 60 Hz is used as the liquid crystal material. That is, the resistivity of the liquid crystal layer 20 is desirably equal to or larger than $10^{12}\Omega cm^2$ and particularly $10^{13}\Omega cm^2$.

The first and second alignment films 24, 25 have the function for vertically aligning liquid crystal molecules on the surface of the substrates. The first and second alignment films 24, 25 are desirably made of polyimide organic film but may be made of SiO vertically evaporated film, surface active agent or chrome complex.

The protrusion 36 for controlling alignment is disposed in order to restrict directions of the liquid crystal molecules falling down upon application of voltage. It is necessary to restrict the direction in which the vertically aligned liquid crystal molecules fall down by voltage. In the embodiment, the protrusion is used by way of example, although the measures for controlling alignment are not limited thereto and an electrode slit, for example, may be used therefor. The alignment direction of the liquid crystal molecules in the liquid crystal layer 20 are inclined with respect to the normal-line direction of the substrate in accordance with inclination of the protrusion 36 in the peripheral area of the protrusion 36. The protrusion 36 is made of acrylic resin, for example, by means of photoetching. In FIG. 5, two protrusions 36 are formed in one pixel, although the number of protrusions is not limited thereto and one or more protrusions may be disposed in one pixel. The protrusions 36 are desirably disposed at substantially equal spaces.

The black matrix 37 is disposed in order to cut off leakage of light caused by disturbance in alignment of the liquid crystal in the periphery of the protrusion 36. The black matrix 37 can be made of opaque material such as metal and is desirably made of chromium, tantalum-molybdenum, tantalum, aluminum, copper or the like.

The color filter 23 includes red, green and blue areas arranged for each pixel and transmitting red, green and blue light, respectively. Such arrangement includes striped arrangement and deltoid arrangement, for example.

The common electrode 21 is made of transparent conductive material such as, for example, indium tin oxide (ITO) and zinc oxide (ZnO).

The reflecting plate 26 is disposed in order to reflect external light incident from the side of the first substrate 18 upon displaying by reflection. The reflecting plate 26 has unevenness in order to diffuse the reflected light.

Further, since the reflecting plate 26 is connected to the pixel electrode 22 in order to set the transmission area and the reflection area to the same potential, the reflecting plate 26 can fill the role of the pixel electrode in the reflection area and is made of metal having high conductivity. Particularly, the reflecting plate 26 is made of silver or aluminum having high reflection factor in the visible area and excellent conductivity.

The step 44 is made of resist material and is disposed in order to make the voltage-to-transmissivity characteristic of the transmission area equal to that of the reflection area.

Referring now to FIGS. 4 and 5, the pixel electrode 22 is described.

FIG. 4 is an equivalent circuit diagram of pixels arranged into a matrix constituting a pixel display area. There are signal lines 28 and scanning lines 29 in the pixel area. The area enclosed by the signal line 28 and the scanning line 29 constitutes one pixel. The signal lines and the scanning lines are substantially orthogonal to each other and at least one thin film transistor (hereinafter abbreviated to TFT) is disposed in each of intersections of the signal lines and the scanning lines. The TFT 30 is connected to a through-hole 27 and the through-hole 27 is connected to the pixel electrode 22 although not shown. In addition, at least one storage capacitor 31 is disposed in one pixel and a pixel signal held therein is prevented from leaking.

Further, the active matrix driving method using the TFT 30 in one pixel is described by way of example, although even if the passive matrix driving method is used, the embodiment can attain the same effects.

The signal line 28 is applied with a voltage signal for controlling the liquid crystal layer 20 and the scanning line 29 is applied with a signal for controlling the TFT 30. The signal line 28 and the scanning line 29 are desirably made of low-resistance conductive material such as, for example, chromium, tantalum-molybdenum, tantalum, aluminum and copper.

FIG. 5 is a plan view showing a pixel on the second substrate 19.

The reflection area and the transmission area are formed in one pixel and the transmission area is further divided into two parts. In FIG. 5, a second transmission area, a first transmission area and a reflection area are formed in order of the description from the side of thin film transistor (TFT) (side where a source electrode 33 is disposed), although the order of forming the areas is not limited thereto. The TFT 30 has the inverse-staggered structure and includes a channel part having a semiconductor layer 32 and the through-hole 27 for connecting the pixel electrode 22 and the source electrode 33.

The pixel electrode 22 is disposed in order to apply an electric field to the liquid crystal layer 20 and is made of transparent conductive material such as, for example, indium tin oxide (ITO) and zinc oxide (ZnO) in the same manner as the common electrode.

Description of the embodiment is directed to the transflective liquid crystal display of the VA system in which the liquid crystal molecules are aligned vertically to the substrate upon no application of voltage and aligned substantially horizontally to the substrate upon application of voltage, wherein the ratio of common electrode 21 occupying the aperture in the transmission area is different from that in the reflection area and the ratio of the common electrode 21 occupying the aperture in the reflection area is equal to or larger than 0% and smaller than 100%.

Consequently, a difference occurs between effective voltages applied to the liquid crystal layers 20 in the transmission area and the reflection area. Accordingly, $\Delta n_T > \Delta n_R$ upon application of voltage and the condition that the voltage-to-transmissivity (reflectivity) characteristics of the transmission area and the reflection area are coincident with each other becomes $d_R > d_T/2$ (particularly, $2\Delta n_T = \Delta n_R$ is desirable in order to set $d_R = d_T$).

As described above, the effect that the liquid crystal display capable of displaying a picture with high picture quality without complicating the pixel structure while suppressing reduction in the aperture ratio can be provided is attained.

Concretely, the structure in which a difference occurs between effective voltages applied to the liquid crystal layers 20 in the transmission area and the reflection area is now described. Such occurrence of the difference can be attained by using the common electrode 21 as shown in FIG. 6, for example.

Figure 7:
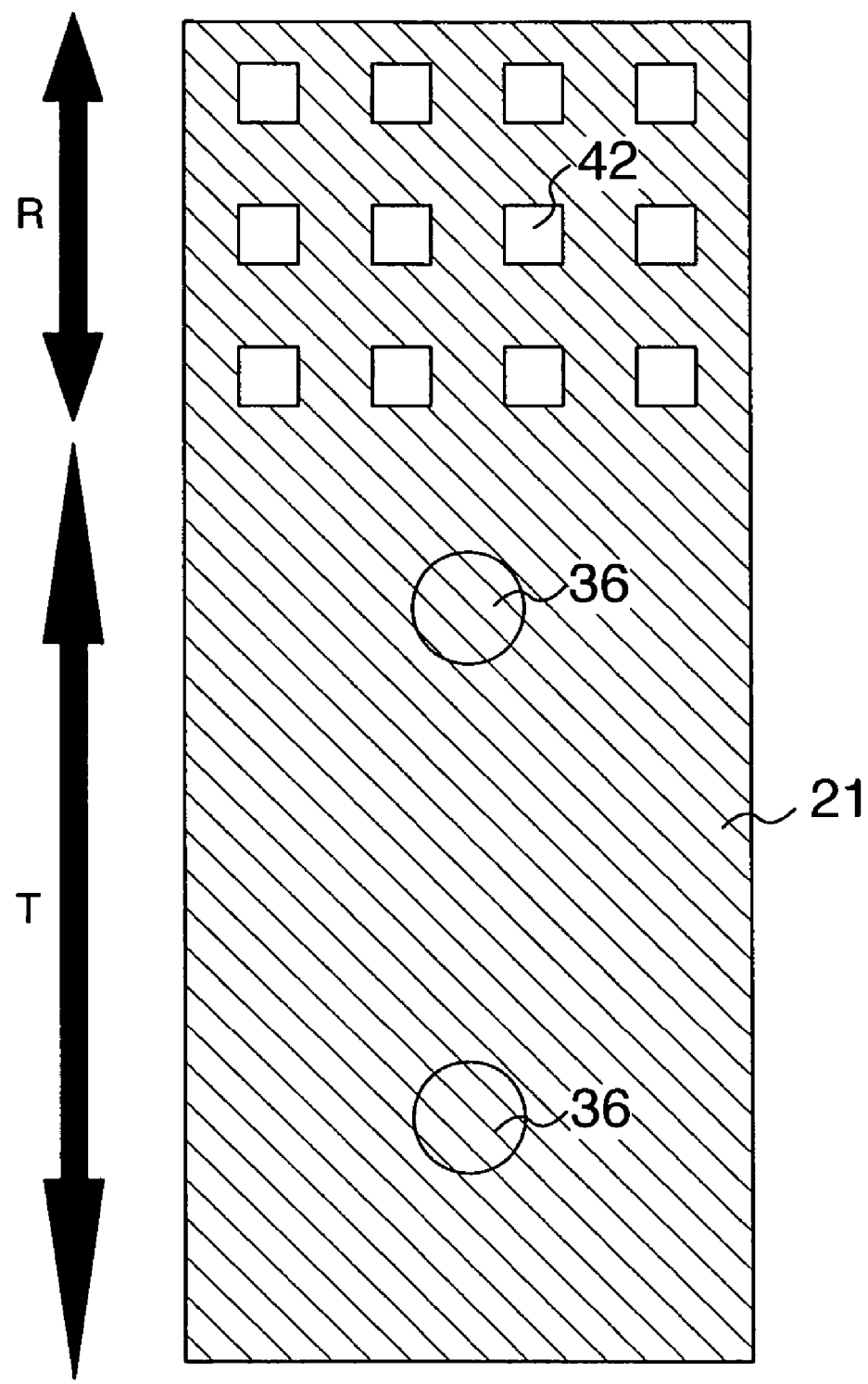
FIG. 7 is a plan view showing another example of a pixel on the first substrate in FIG. 3.

FIG. 6 is a plan view showing one pixel on the first substrate 18. An inter-digital electrode 41 is formed in the reflection area of the common electrode 21 shown in FIG. 6. The electrode formed in the reflection area of the common electrode 21 is not limited to the inter-digital electrode 41 but it may be a mesh electrode 42 as shown in FIG. 7, for example.

Figure 21:
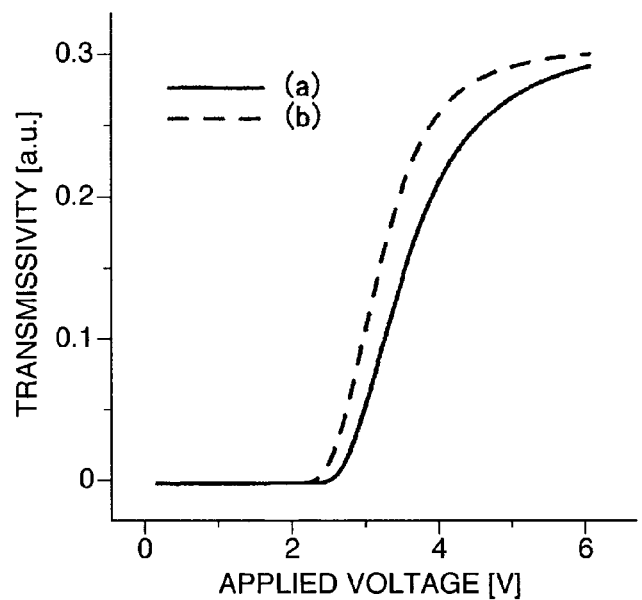
FIG. 21 is a graph explaining voltage-to-transmissivity characteristics of the embodiment 1 of the present invention.

FIG. 21 is a graph showing the result of theoretical calculation for the voltage-to-transmissivity characteristic. (a) of FIG. 21 represents a curve in case where the ratio of the common electrode 21 occupying the aperture is 60% and (b) of FIG. 21 represents a curve in case where the ratio of the common electrode 21 occupying the aperture is 100%.

In the case (a) of FIG. 21, threshold voltage and voltage indicating the half tone are shifted to a high-voltage side as compared with the case (b) of FIG. 21. This means that the transmissivity in the case (a) is about 82% of the transmissivity in the case (b) upon application of 4 V, for example. In other words, when the case (a) is used for the common electrode 21 in the reflection area and the case (b) is used for the common electrode 21 in the transmission area, the relation of $\Delta n_T > \Delta n_R$ can be realized upon application of voltage. Accordingly, the structure of the embodiment can attain the relation of $d_R/d_T > 0.5$.

Embodiment 2

Another embodiment of a liquid crystal display according to the present invention is now described.

Description of the embodiment is directed to the transflective liquid crystal display of the electrically controlled birefringence (hereinafter abbreviated to ECB) system in which the liquid crystal molecules are aligned substantially horizontally to the substrate upon no application of voltage and aligned substantially vertically to the substrate upon application of voltage, wherein the ratio of common electrode 21 occupying the aperture in the transmission area is different from that in the reflection area and the ratio of the common electrode 21 occupying the aperture in the reflection area is equal to or larger than 0%-and smaller than 100%.

By using the liquid crystal display of the embodiment, the ratio $d_R/d_T$ of the thickness $d_R$ of the reflection area and the thickness $d_T$ of the transmission area can be set to be equal to or larger than 0.5 and smaller than or equal to 1. Consequently, the aperture ratio can be improved and further the cost can be reduced since the production process can be decreased.

The sectional structure of the liquid crystal display of the embodiment is the same as that of FIG. 1 but the liquid crystal cell 10 is changed from the VA system to the ECB system.

Figure 8:
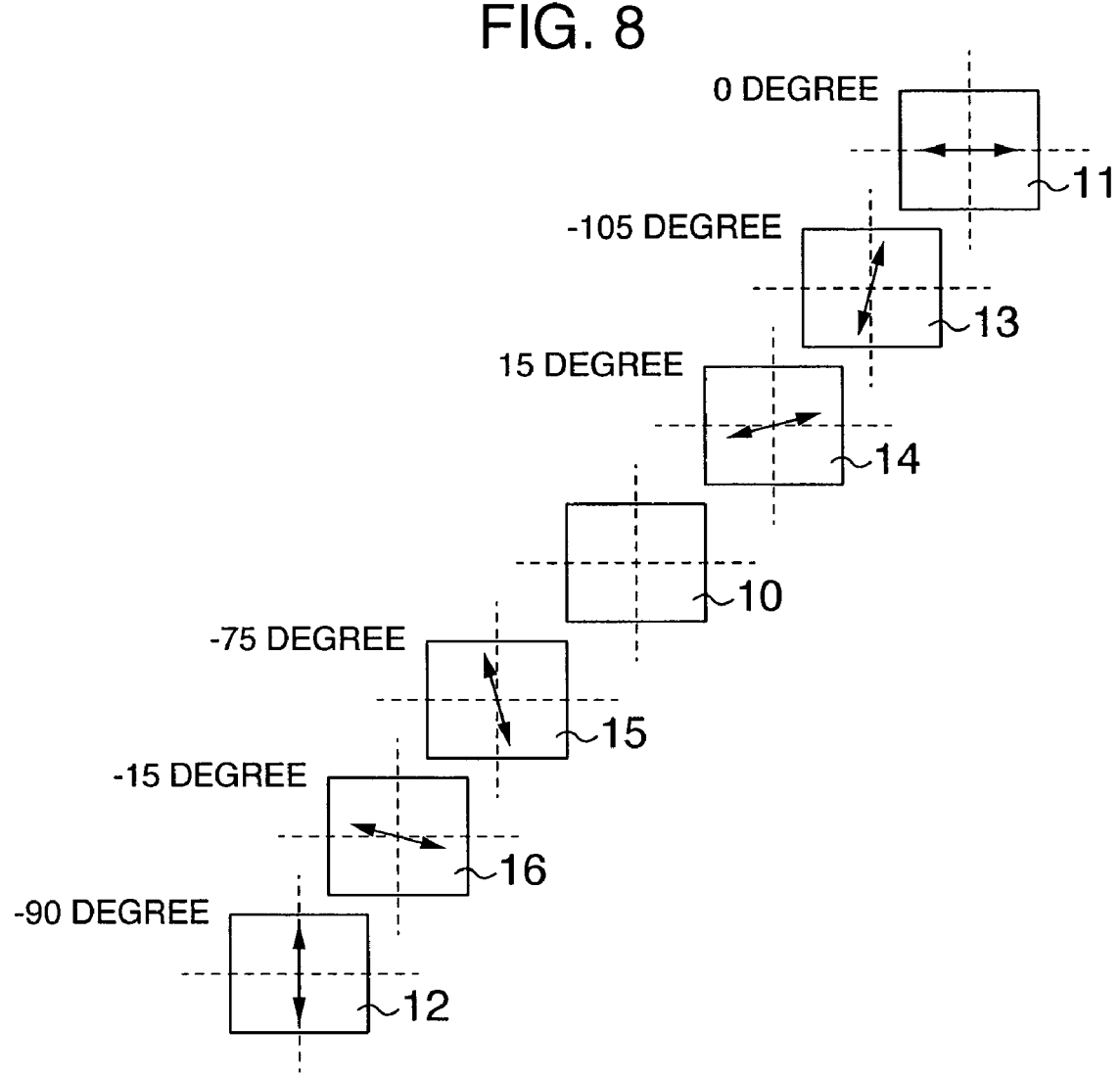
FIG. 8 is a diagram showing the relation of retardation films and optical axes of polarization plates in FIG. 9.

FIG. 8 is a diagram showing the relation of the optical axes of the retardation films and the polarization plates according to the liquid crystal display of the embodiment in the normally closed state.

In order to achieve the broadband circular polarization plate having small dependence on wavelength, it is necessary to dispose the retardation films as shown in FIG. 8. Delay phase axes of the first and fourth retardation films 13 and 16 are substantially orthogonal to each other and delay phase axes of the second and third retardation films 14 and 15 are also substantially orthogonal to each other. Further, the relation of the absorption axes of the first and second polarization plates 11 and 12 and the delay phase axes of the first to fourth retardationl films are set so that, when the absorption axis of the first polarization plate 11 is set to 0 degree, the delay phase axes of the first, second, third and fourth retardation films 13, 14, 15 and 16 are −105, 15, −75 and −15 degrees, respectively, and the absorption axis of the second polarization plate 12 is −90 degrees.

Figure 9:
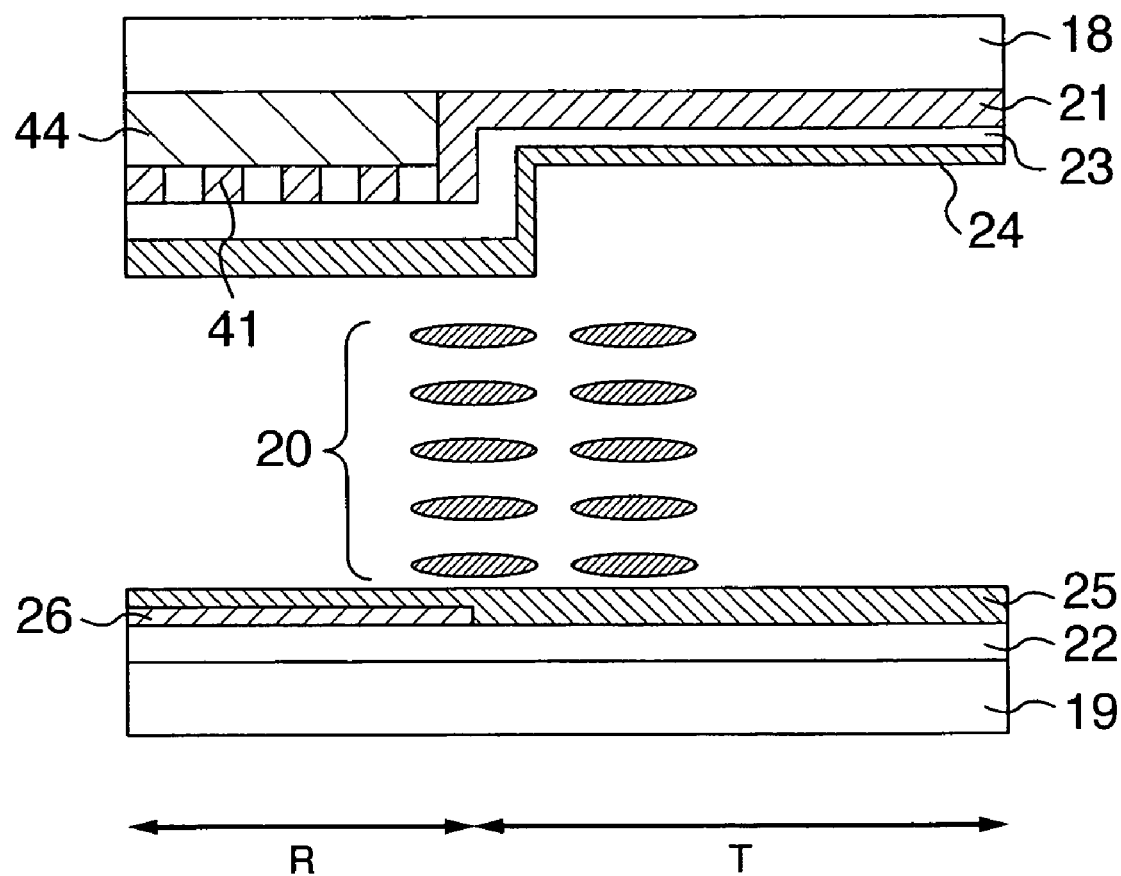
FIG. 9 is a sectional view showing another embodiment of a liquid crystal cell in FIG. 1.
Figure 11:
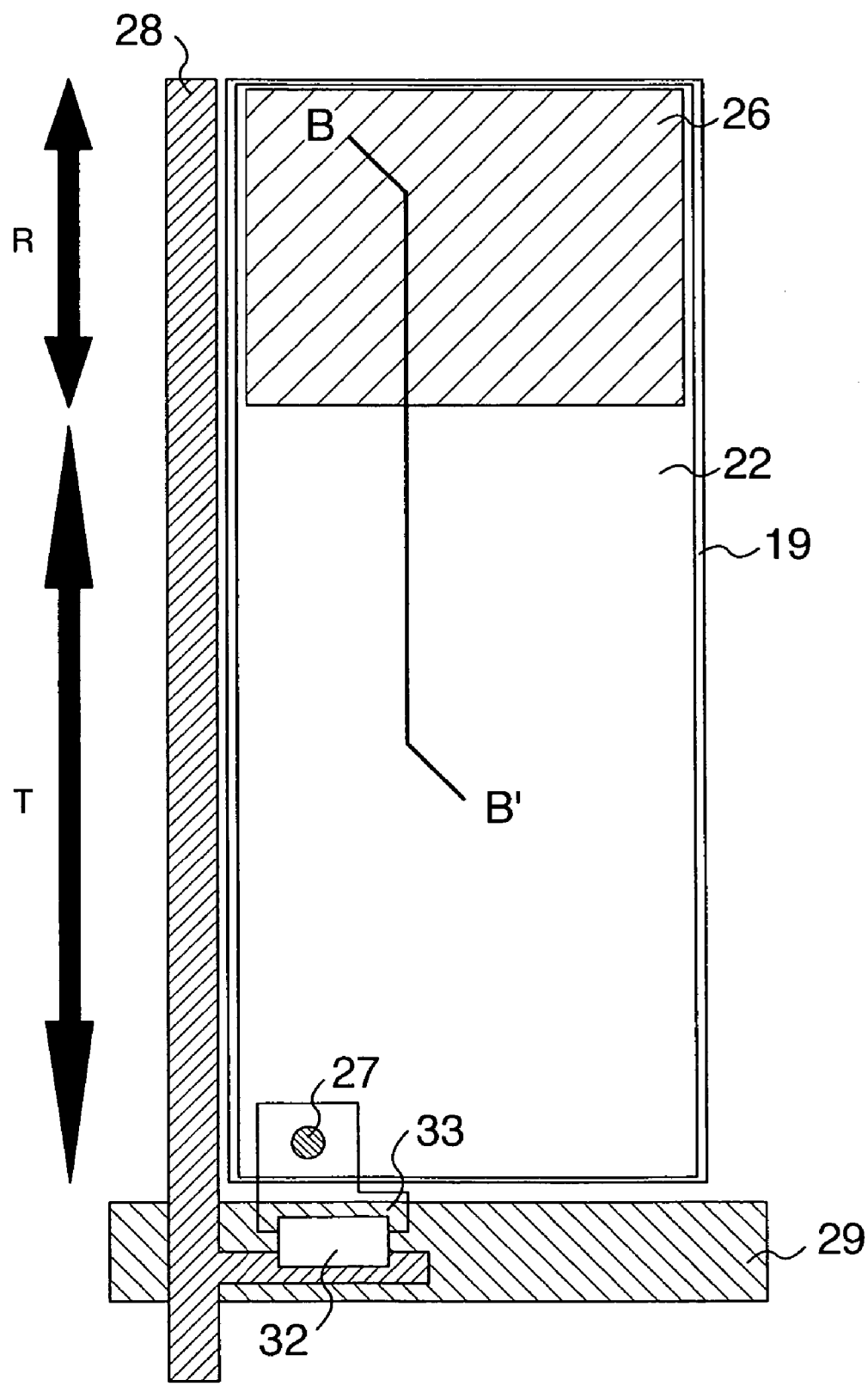
FIG. 11 is a plan view showing an example of a pixel on a second substrate in FIG. 9.

FIG. 9 is another sectional view showing the liquid crystal cell 10 of FIG. 1 taken along line B-B' of FIG. 11 and line of FIG. 6 corresponding to line B-B' of FIG. 11.

The transflective liquid crystal display of the embodiment includes the transmission area (T part of FIG. 9) and the reflection area (R part of FIG. 9) in one pixel. The liquid crystal cell 10 includes the first substrate 18, the second substrate 19 and the liquid crystal layer 20 disposed between the first and second substrate. The first substrate 18 includes a color filter 23, a common electrode 21 and a first alignment film 24 on the side of the liquid crystal layer 20 of the first substrate 18, and the second substrate 19 includes a pixel electrode 22 and a second alignment film 25 on the side of the liquid crystal layer 20 of the second substrate 19. That is, a common electrode 21, a color filter 23 and a first alignment film 24 are disposed adjacent to the first substrate 18 on the side of the liquid crystal layer 20 of the first substrate 18, and a pixel electrode 22 and a second alignment film 24 are disposed adjacent to the second substrate 19 on the side of the liquid crystal layer 20 of the second substrate 19.

The liquid crystal layer 20 is constituted by a liquid crystal composition showing the positive dielectric isotropy having the dielectric constant in the major-axis direction of the liquid crystal molecules larger than that in the minor-axis direction. As liquid crystal material thereof, material showing the nematic phase in the wide range containing the room temperature area is used. Further, material showing the high electrical resistivity with which the transmission factor is sufficiently held during the hold time and flicker is not produced in driving conditions using thin film transistors (TFT), for example in the resolution of QVGA (the number of lines is 240) and the driving frequency of 60 Hz is used as the liquid crystal material. That is, the resistivity of the liquid crystal layer 20 is desirably equal to or larger than $10^{12}\Omega cm^2$ and particularly $10^{13}\Omega cm^2$.

The alignment state of the liquid crystal layer 20 is desirably set so that the twist angle is equal to or larger than 0 degree and smaller than or equal to 90 degrees between the first and second substrates 18 and 19. Further, the liquid crystal layer 20 is aligned substantially horizontally to the substrate but it desirably has a pretilt angle equal to or larger than 0 degree and smaller than 10 degrees in the vicinity of interfaces with the first and second substrates 18, 19. The arrangement of the retardation films shown is an example and is not limited to the above arrangement.

In the embodiment, the twist angle of the liquid crystal layer 20 is desirably 0 degree and the phase difference of the liquid crystal layer 20 upon no application of voltage is desirably ¼ wavelength.

Figure 10:
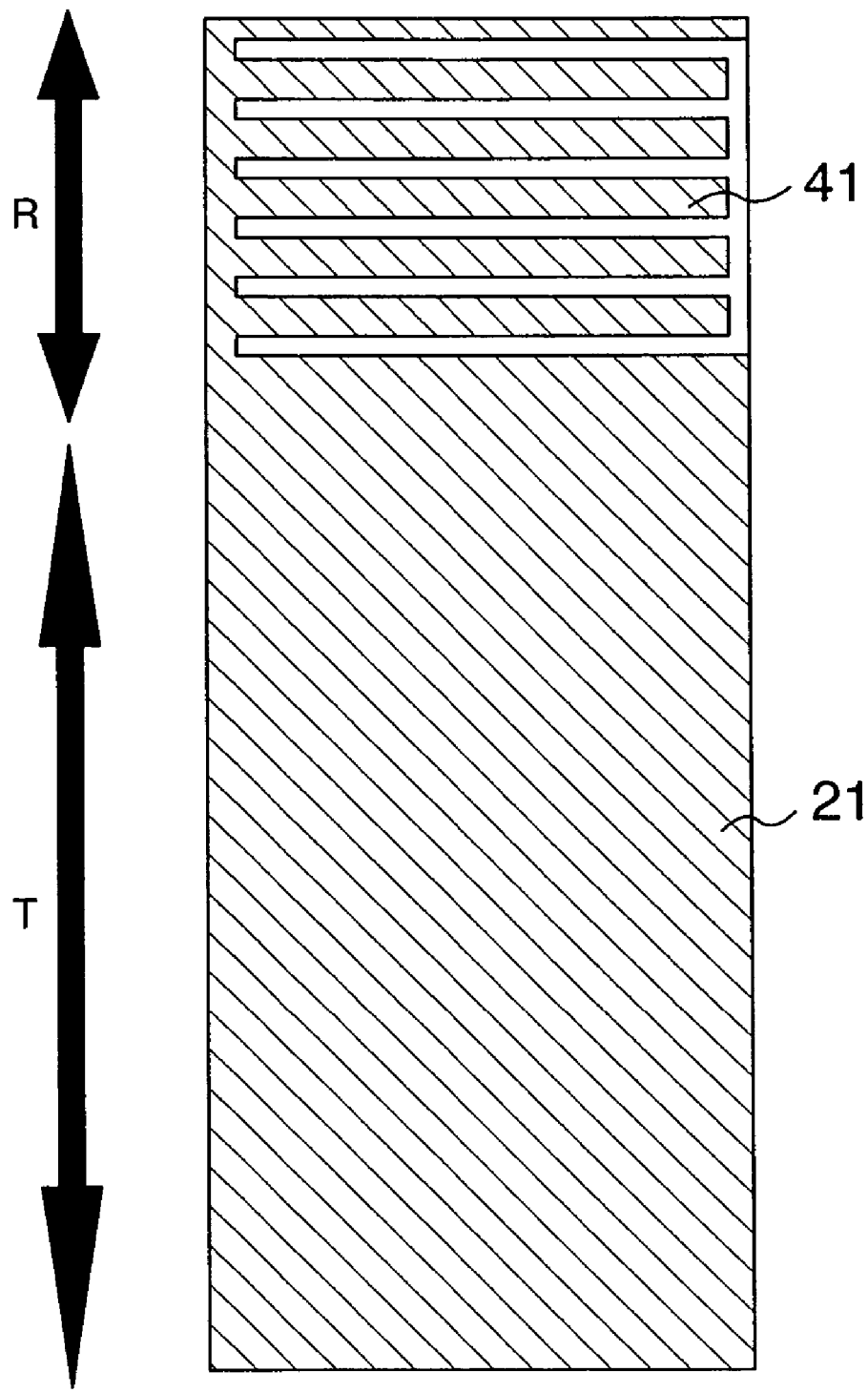
FIG. 10 is a plan view showing an example of a pixel on a first substrate in FIG. 9.

FIG. 10 is a plan view showing one pixel on the first substrate 18.

An inter-digital electrode 41 is formed in the reflection area of the common electrode 21 shown in FIG. 10. In this manner, by using the common electrode 21 constituted by the inter-digital electrode in the reflection area, an electric field applied to the liquid crystal layer 20 in the reflection area can be made small as compared with the transmission area. Accordingly, when voltage is applied, a difference occurs in retardation in planes of the transmission and reflection areas. However, since this effect can be obtained by making the ratio of the area of effective pixel in the reflection area and the area of the electrode smaller than that in the transmission area, the shape of the common electrode 21 in the reflection area is not limited to the inter-digital shape and a mesh electrode, for example, may be used as far as the common electrode has the electrode structure in which electrodes are disposed at regular intervals.

FIG. 11 is a plan view showing one pixel on the second substrate 19. The transflective liquid crystal display is required to have the reflecting plate for reflecting incident light. Accordingly, as shown in FIG. 11, the reflecting plate 26 for reflecting incident light is disposed in the reflection area.

In the above structure, the ratio of the area for effective pixel and the area for the common electrode 21 in the reflection area is made smaller than the ratio of the area for effective pixel and the area for the common electrode 21 in the transmission area. Consequently, a difference can be produced between effective voltages applied to liquid crystal layers 20 in the transmission area and the reflection area. Accordingly, $\Delta n_T > \Delta n_R$ upon application of voltage and the condition that the voltage-to-transmissivity (reflectivity) characteristics of the transmission area and the reflection area become $d_R > d_T/2$ from the expression (1), so that the aperture ratio can be improved and the cost is reduced since the production process is decreased.

Embodiment 3

Another embodiment of a liquid crystal display according to the present invention is now described.

The liquid crystal display of the embodiment is directed to the transflective liquid crystal display of the VA system in which two-domain alignment is achieved to have high transmission factor. In the embodiment, the ratio of common electrode 21 occupying the aperture in the transmission area is different from that in the reflection area and the ratio of the common electrode 21 occupying the aperture in the reflection area is equal to or larger than 0% and smaller than 100% in the same manner as the embodiments 1 and 2. By using this liquid crystal display, the ratio $d_R/d_T$ of the thickness $d_R$ of the reflection area and the thickness $d_T$ of the transmission area can be made equal to or larger than 0.5 and smaller than or equal to 1. Consequently, the aperture ratio can be improved and the cost can be reduced since the production process can be decreased.

Figure 12:
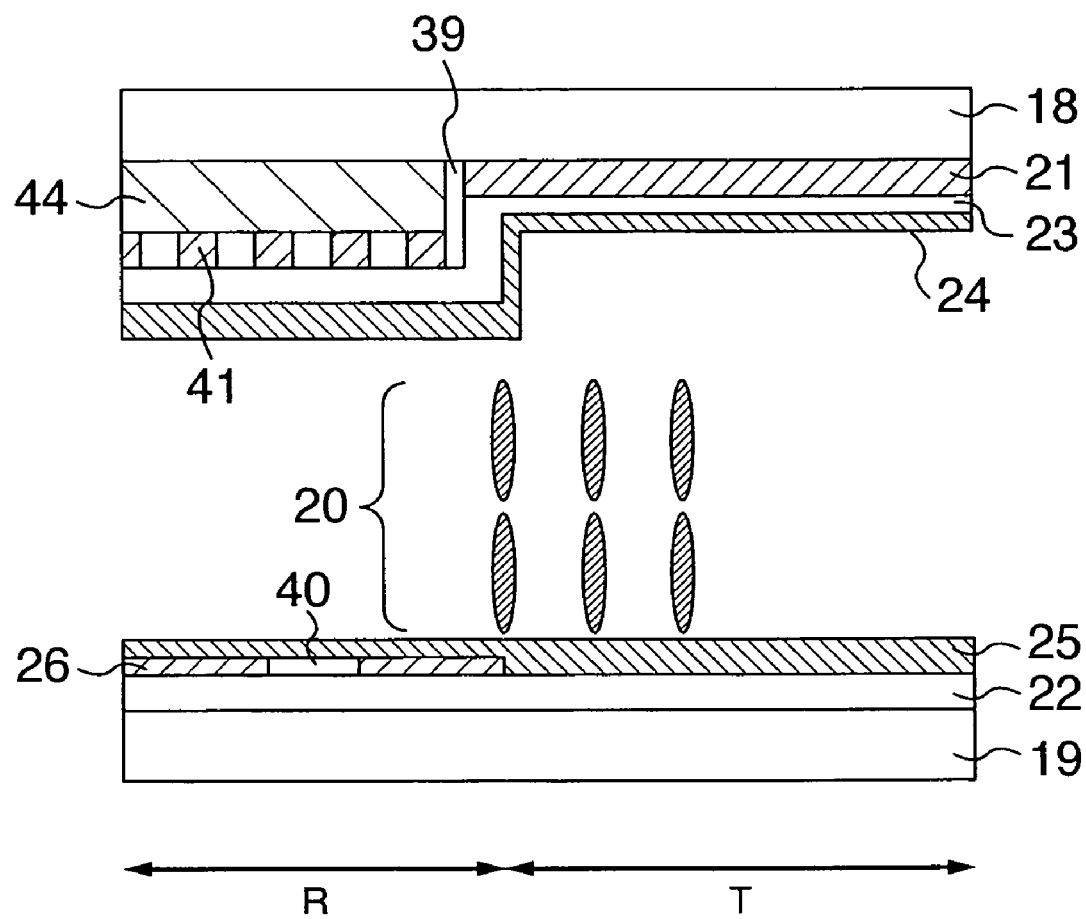
FIG. 12 is a sectional view showing another embodiment of the liquid crystal cell in FIG. 1.
Figure 13:
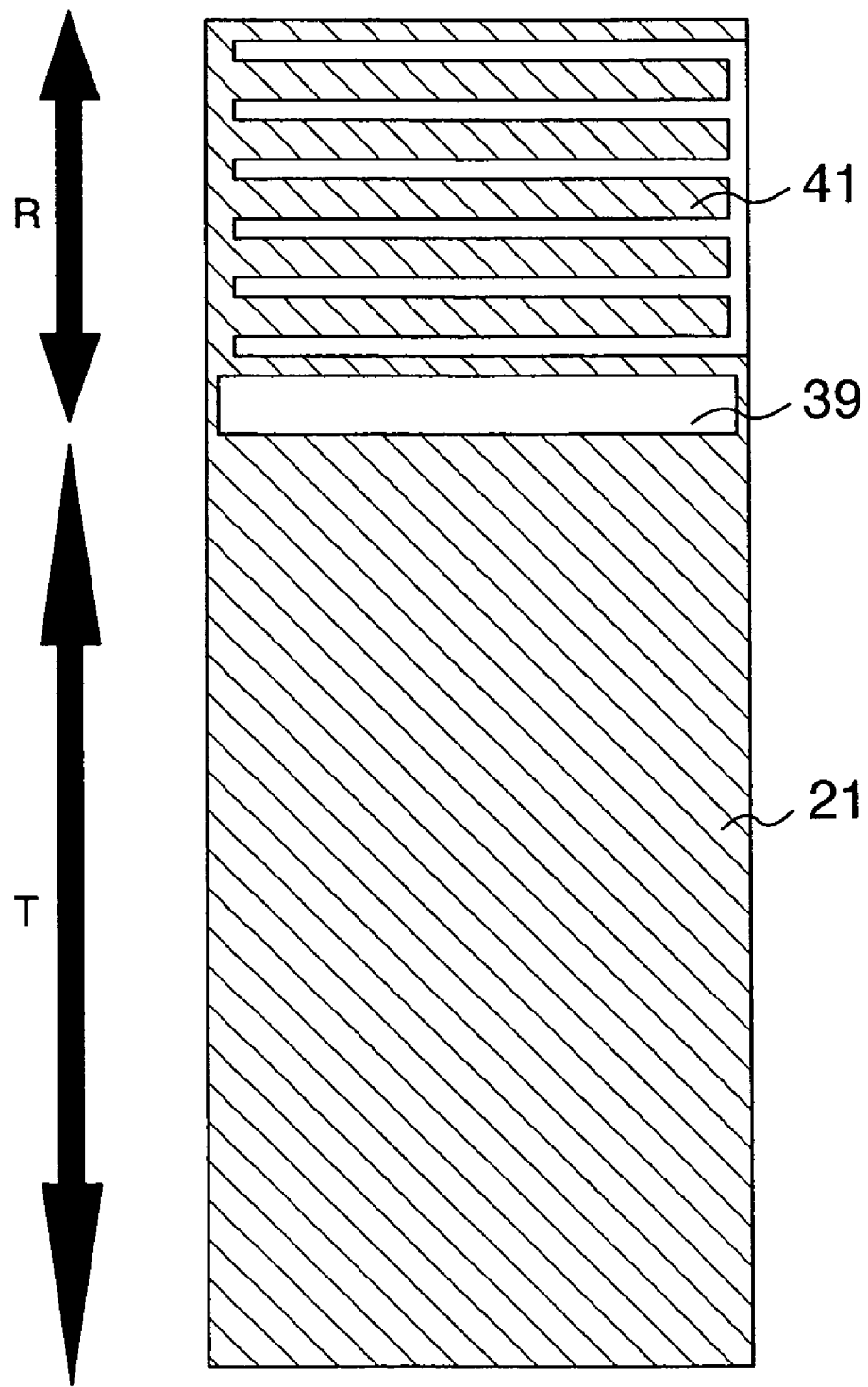
FIG. 13 is a plan view showing an example of a pixel on a first substrate in FIG. 12.
Figure 14:
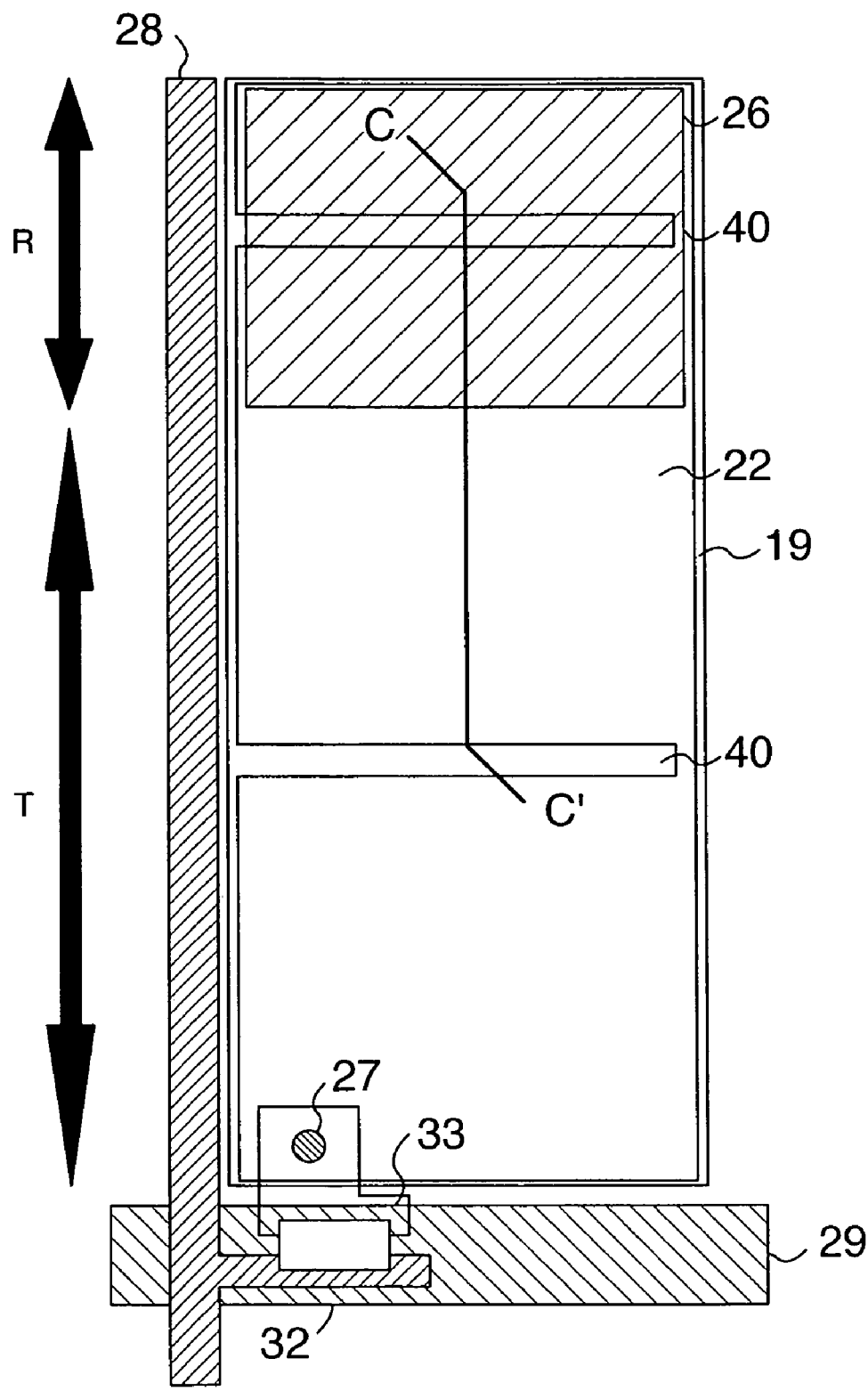
FIG. 14 is a plan view showing an example of a pixel on a second substrate in FIG. 12.

FIG. 12 is another sectional view of the liquid crystal cell 10 of FIG. 1 in the transflective liquid crystal display of the VA system taken along line C-C' of FIG. 14 and line of FIG. 13 corresponding to line C-C' of FIG. 14. The fundamental structure thereof is the same as that of the embodiment 1.

FIG. 13 is a plan view showing one pixel on the first substrate 18 of FIG. 12. A first electrode slit 39 for controlling alignment is disposed between the reflection area and the transmission area. The electrode slit is disposed in order to restrict directions in which the vertically aligned liquid crystal molecules fall down by voltage. The common electrode 21 in the reflection area includes an inter-digital electrode 41.

FIG. 14 is a plan view showing one pixel on the second substrate 19 of FIG. 12. Second electrode slits 40 for controlling alignment are disposed in the substantially middle portions of the transmission area and the reflection area.

Figure 22A:
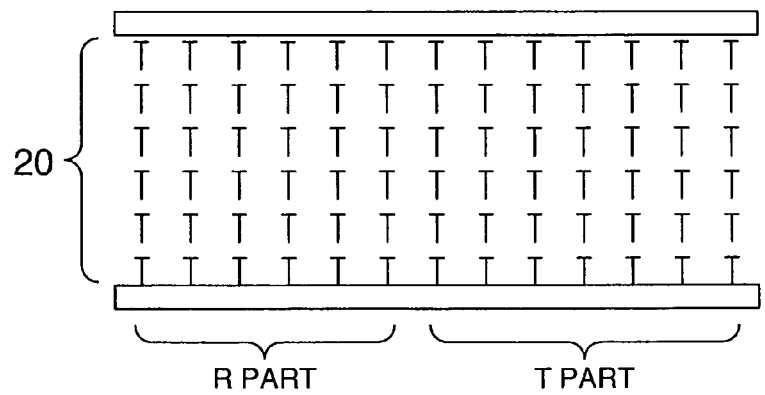
FIGS. 22A and 22B are diagrams explaining alignment of liquid crystal of an embodiment 3, of the present invention.
Figure 22B:
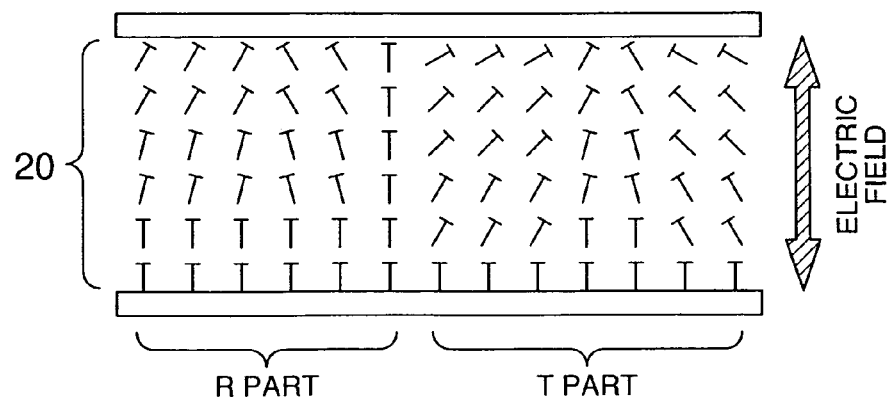

FIGS. 22A and 22B show alignment states of the liquid crystal molecules in the liquid crystal layer 20 disposed between the pair of substrates of FIG. 12. FIG. 22A shows an alignment state of the liquid crystal molecules when a voltage is not applied and FIG. 22B shows another alignment state of the liquid crystal molecules when a voltage sufficiently larger than the threshold voltage is applied. T part of FIG. 22 is supposed as the transmission area and the ratio of the common electrode 21 occupying the aperture is 100%. R part of FIG. 22 is supposed as the reflection area and the ratio of the common electrode 21 occupying the aperture is 60%. At this time, the thickness of the liquid crystal layer 20 is 3 µm and the common electrodes 21 are disposed at intervals of the sum of the width of the electrode part equal to 5 µm and the slit between the electrode parts equal to 4 µm in the falling-down direction of liquid crystal molecules.

The structure of the embodiment constitutes the two-domain structure in each of the reflection and the transmission areas. The tilt angle from the normal-line direction of the substrate of the liquid crystal molecules is different in accordance with electric field in the transmission area (T part of FIG. 22B) and the reflection area (R part of FIG. 22B). Hence, the relation of $\Delta n_T > \Delta n_R$ is realized upon application of voltage. Accordingly, the relation of $d_R > d_T/2$ can be achieved by the structure of the embodiment. Further, since the protrusion 36 for controlling alignment is not required, the liquid crystal display having high aperture ratio and high transmission factor can be attained.

Embodiment 4

Another embodiment of the second substrate of the liquid crystal display according to the present invention is now described.

In the transflective liquid crystal display of the embodiment, the ratio of the pixel electrode 22 occupying the aperture in the transmission area is different from that in the reflection area and the ratio of the pixel electrode 22 occupying the aperture in the reflection area is equal to or larger than 0% and smaller than 100%. By using this structure, the ratio $d_R/d_T$ of the thickness $d_R$ of the reflection area and the thickness $d_T$ of the transmission area can be made equal to or larger than 0.5 and smaller than or equal to 1. Consequently, the aperture ratio can be improved and the cost can be reduced since the production process can be decreased.

The embodiment is different from the embodiment 2 in that the structure of the common electrode 21 and the pixel electrode 22 is changed and other fundamental structure is the same as that of the embodiment 2.

In the embodiments 1 to 3, the ratio of the common electrode 21 occupying the aperture in the transmission area is different from that in the reflection area and the ratio of the common electrode 21 occupying the aperture in the reflection area is made equal to or larger than 0% and smaller than 100%, so that the ratio $d_R/d_T$ of the thickness $d_R$ of the reflection area and the thickness $d_T$ of the transmission area can be made equal to or larger than 0.5 and smaller than or equal to 1. The same effects can be attained even when the ratio of the pixel electrode 22 occupying the aperture in the transmission area is different from that in the reflection area and the ratio of the pixel electrode occupying the aperture in the reflection area is made equal to or larger than 0% and smaller than 100%. At this time, the common electrode can be made to be allover.

Figure 15:
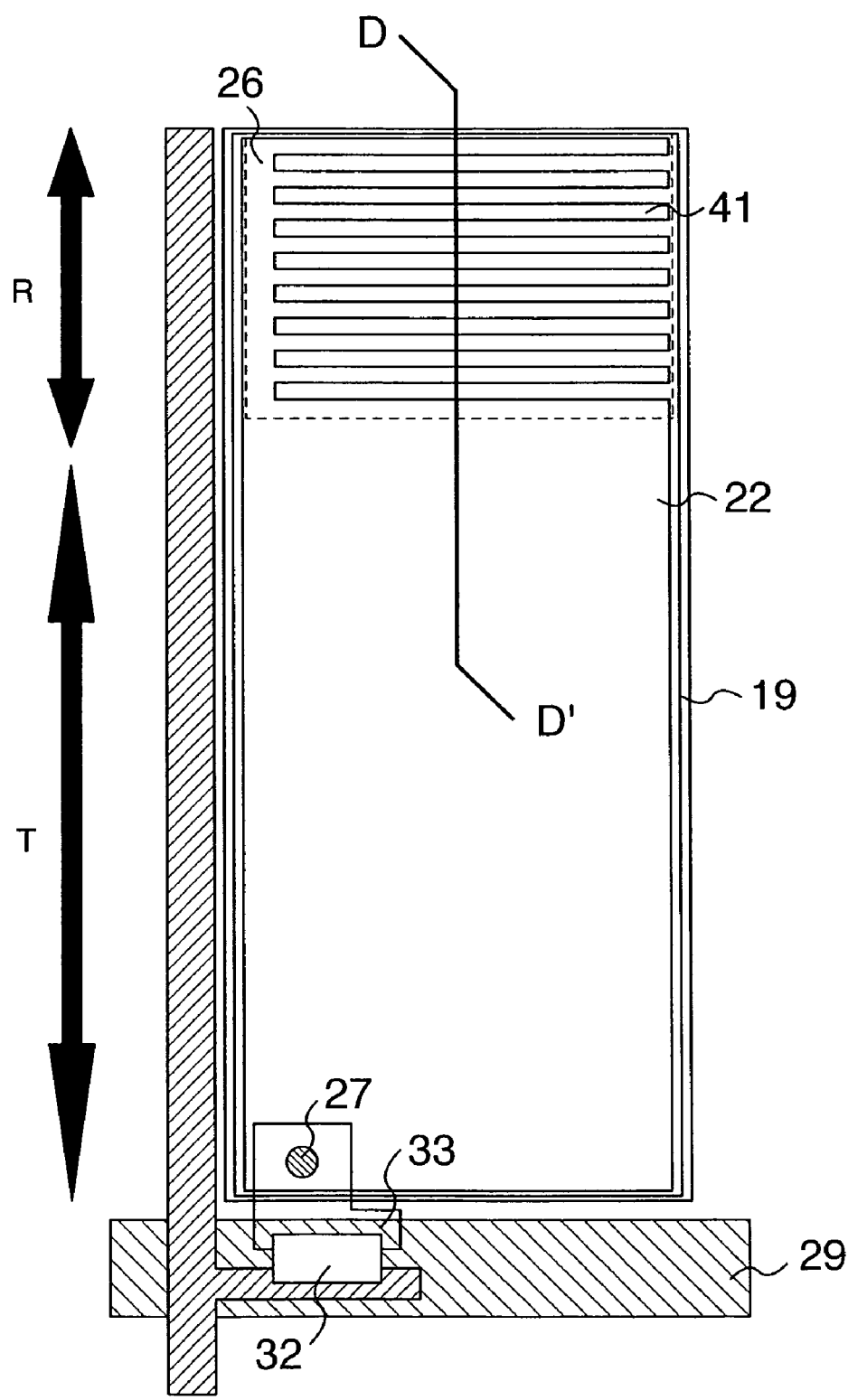
FIG. 15 is a plan view showing another example of a pixel on the second substrate in FIG. 12.

FIG. 15 is a plan view showing one pixel on the second substrate 19. The reflecting plate 26 is disposed in the reflection area on the side of the liquid crystal layer 20 of the second substrate 19. The pixel electrode 22 in the reflection area in which the reflecting plate 26 is disposed includes the inter-digital electrode 41.

Figure 16:
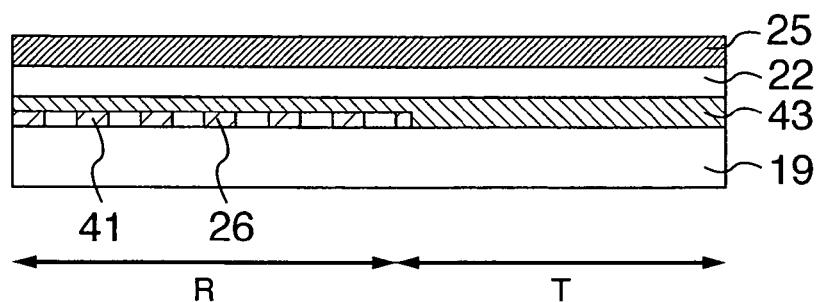
FIG. 16 is a sectional view showing the second substrate in FIG. 15.

FIG. 16 is a sectional view showing the second substrate 19 taken along line D-D' of FIG. 15. The reflecting plate 26 is disposed in the reflection area (R part of FIG. 16) of the second substrate 19. An insulating layer 43 is disposed between the second substrate 19 and the pixel electrode 22.

The insulating layer 43 is disposed between the pixel electrode 22 and the reflecting plate 26 in order to insulate the pixel electrode 22 and the reflecting plate 26. The insulating plate 43 is desirably made of insulating material having excellent transparency and particularly polyimide organic film or silicon nitride film is desirable.

In the embodiment, the ratio of the pixel electrode 22 occupying the aperture in the transmission area is different from that in the reflection area and the ratio of the pixel electrode 22 occupying the aperture in the reflection area is made equal to or larger than 0% and smaller than 100%, so that the same effects as the embodiment 2 can be obtained.

Further, in the embodiments 1 to 3, it is necessary to align the electrode in the reflection area of the first substrate 18 with the reflecting plate 26 disposed on the second substrate 19. However, in the embodiment 4, since it is not necessary, the yield can be improved. Even in the embodiments 1 and 3, the structure of the common electrode 21 and the pixel electrode 22 can be changed to thereby attain the same effects.

Embodiment 5

The embodiment includes the pixel electrode 22 having the structure changed differently from that of the embodiment 4. Other fundamental structure is the same as that of the embodiment 4.

The reflecting plate 26 used in the transflective liquid crystal display of the embodiment is made of insulating material and particularly is desirably made of dielectric multi-layer film.

By making the reflecting plate 26 of insulating material as described above, the insulating layer disposed in order to insulate the pixel electrode 22 and the reflecting plate 26 can be eliminated as compared with the case where the reflecting plate 26 is used so as not to made the reflecting plate of insulating material as in the embodiment 4.

Accordingly, the production process of the liquid crystal display can be decreased and the cost thereof can be reduced while attaining the same effects as the embodiment 4.

Embodiment 6

The transflective liquid crystal display of the embodiment includes the structure in which the ratio of the pixel electrode 22 occupying the aperture in the transmission area is different from that in the reflection area and the ratio of the pixel electrode 22 occupying the aperture in the reflection area is equal to or larger than 0% and smaller than 100% as described in the embodiments 4 and 5 in addition to the structure in which the ratio of the common electrode 21 occupying the aperture in the transmission area is different from that in the reflection area and the ratio of common electrode 21 occupying the aperture in the reflection area is equal to or larger than 0% and smaller than 100% as described in the embodiments 1 to 3.

As described above, in the embodiment, both the ratios of the common electrode 21 and the pixel electrode 22 occupying the aperture in the reflection area can be made equal to or larger than 0% and smaller than 100% to thereby decrease the production process of the liquid crystal display and reduce the cost. This can be attained by changing the pixel electrode 22 described in the embodiment 2 into the pixel electrode 22 shown in FIG. 15.

Figure 23:
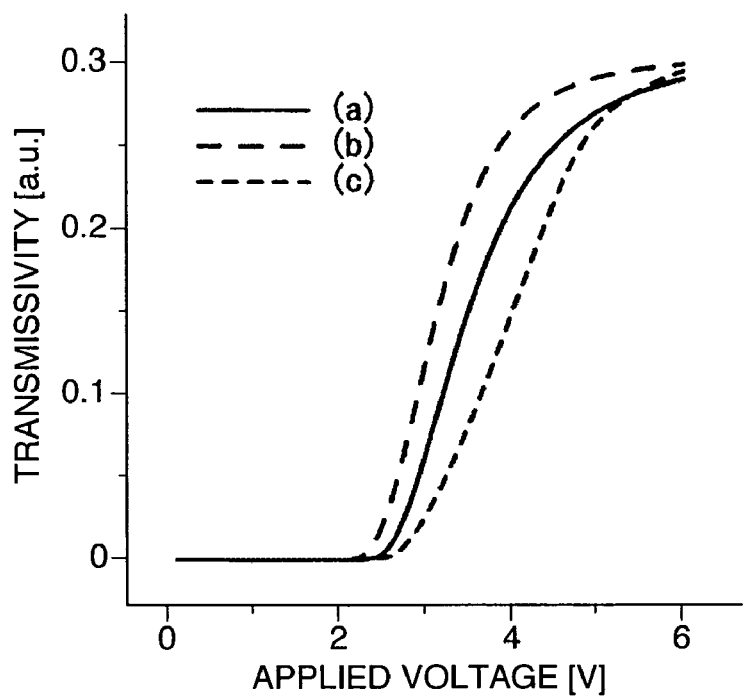
FIG. 23 is a graph explaining the voltage-to-transmissivity characteristics of the embodiments 1 and 6 of the present invention.

FIG. 23 shows theoretically calculated results of the voltage-to-transmissivity characteristics in the ratios of the common electrode 21 and the pixel electrode 22 occupying the aperture in the reflection area.

In FIG. 23, (a) represents the case where the ratio of the common electrode 21 occupying the aperture is 60%, (b) the case where it is 100% and (c) the case where the ratios of the common electrode 21 and the pixel electrode 22 occupying the aperture are each 60%.

In this case, the threshold voltage and the voltage showing the half tone are shifted to the side of high voltage in order of (b), (a) and (c). This means that the transmissivity in case of (c) is reduced to about 56% to that of the case (b) upon application of 4 V, for example. That is, when the case (c) is applied to the common electrode 21 in the reflection area and the case (b) to the common electrode 21 in the transmission area, the relation of $\Delta n_T > \Delta n_R$ can be realized upon application of voltage.

Accordingly, the structure of the embodiment can achieve the relation of $d_R/d_T > 0.5$ and improvement of the aperture ratio and reduction of the cost by decrease of the production process can be attained.

Embodiment 7

Another embodiment of the liquid crystal display according to the present invention is described with reference to the drawings.

Description of the embodiment is directed to the liquid crystal display of the VA system having two sub-pixels in one pixel, wherein the ratios of the common electrode 21, the pixel electrode 22 or both of them occupying the aperture in one sub-pixel and in the other sub-pixel are different from each other and the ratio of the common electrode 21, the pixel electrode 22 or both of them occupying the aperture in one sub-pixel is equal to or larger than 0% and smaller than 100%.

The liquid crystal display of the VA system of the embodiment can reduce shift in the γ characteristic in case where the display is observed from the front thereof and the γ characteristic in case where the display is observed from the oblique direction.

Figure 17:
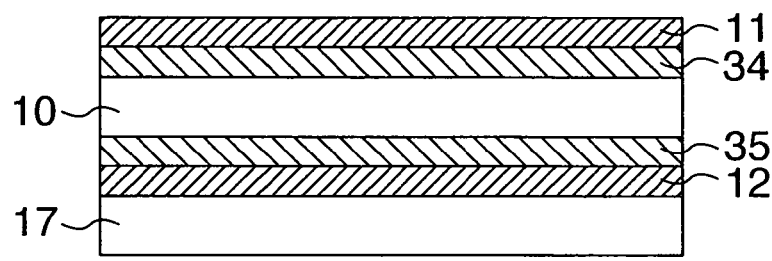
FIG. 17 is a sectional view showing another embodiment of a liquid crystal display according to the present invention.

FIG. 17 is a sectional view of the liquid crystal display of the embodiment.

The transmissive liquid crystal display of the embodiment has two sub-pixels (hereinafter referred to as sub-pixel A and sub-pixel B) in one pixel. The liquid crystal display of the embodiment includes first and second polarization plates 11, 12 and liquid crystal cell 10 disposed between the pair of polarization plates 11, 12. A first negative C-plate 34 is disposed between the first polarization plate 11 and the liquid crystal cell 10. A second negative C-plate 35 is disposed between the second polarization plate 12 and the liquid crystal cell 10. In addition, a backlight unit 17 is disposed adjacent to the second polarization plate 12 on the opposite side to the liquid crystal cell 10 of the second polarization plate 12.

Figure 18:
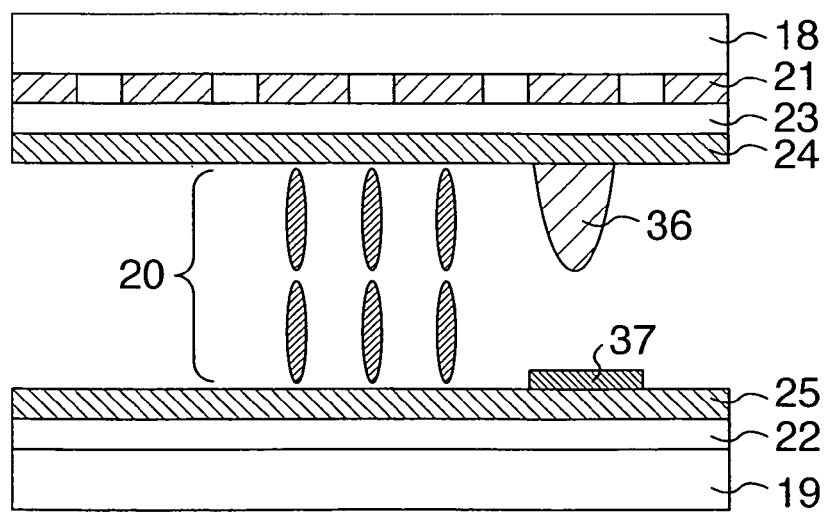
FIG. 18 is a sectional view showing an embodiment of a liquid crystal cell in FIG. 17.
Figure 19:
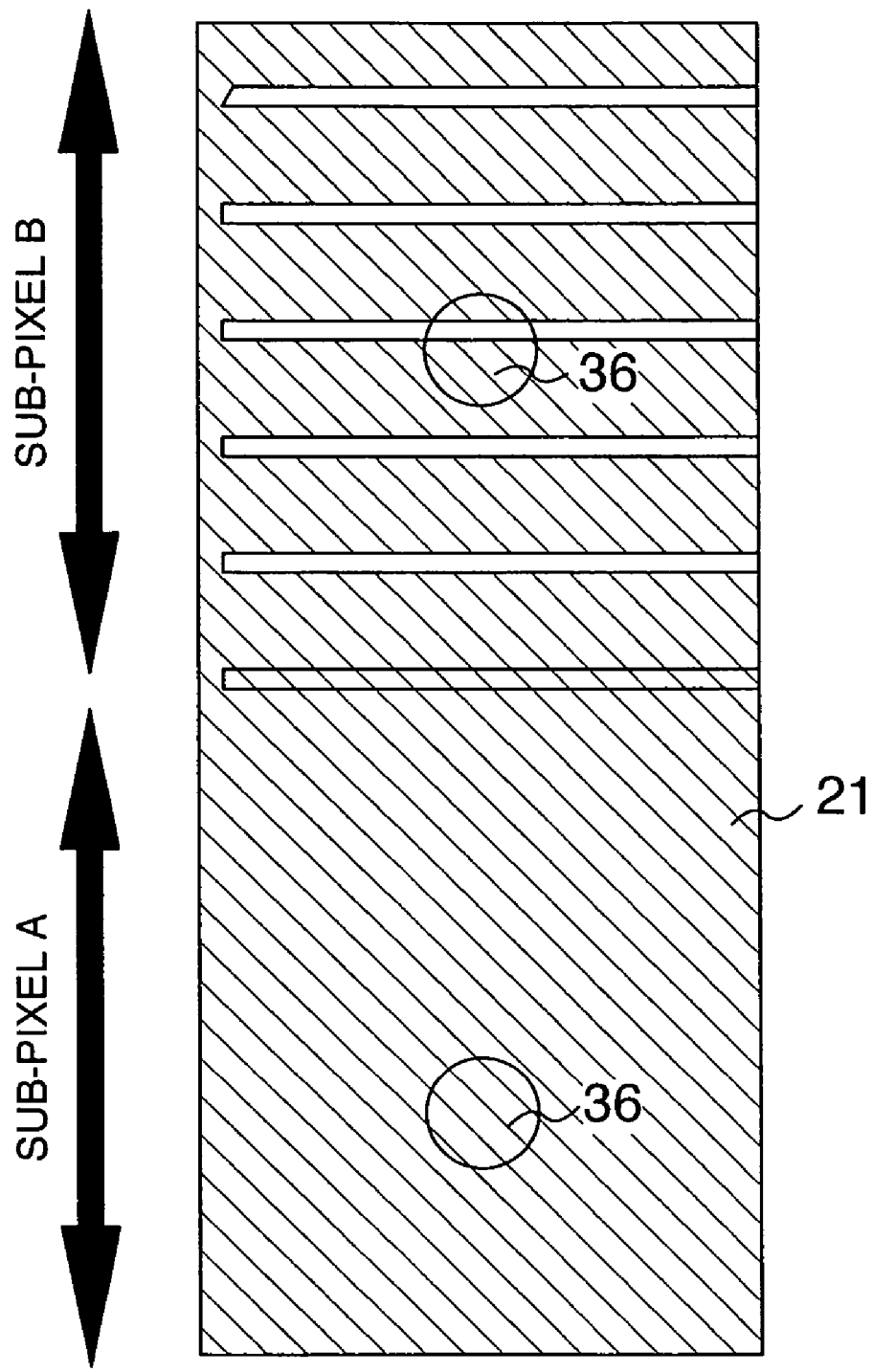
FIG. 19 is a plan view showing an example of a pixel on a first substrate in FIG. 18.
Figure 20:
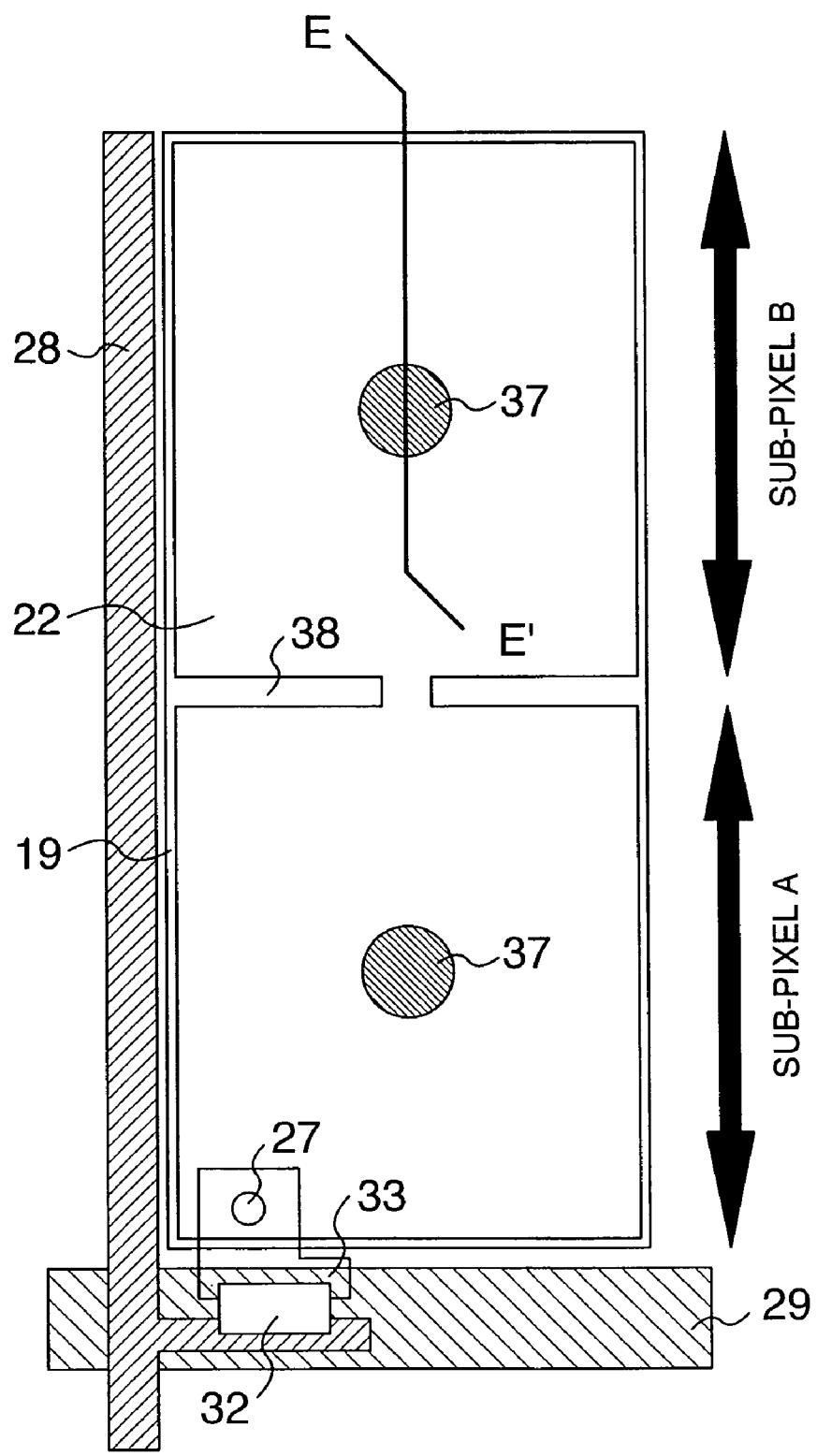
FIG. 20 is a plan view showing an example of a pixel on a second substrate in FIG. 18.

FIG. 18 is a sectional view showing the liquid crystal cell 10 of FIG. 17 taken along line E-E' of FIG. 20 and line of FIG. 19 corresponding to line E-E' of FIG. 20.

The liquid crystal cell 10 includes a pair of first substrate 18 and second substrate 19. Liquid crystal layer 20 is disposed between the first and second substrates 18, 19. Color filter 23, common electrode 21 and first alignment film 24 are disposed on the side of the liquid crystal layer 20 of the first substrate 18. In other words, the color filter 23, the common electrode 21 and the first alignment film 24 are disposed between the first substrate 18 and the liquid crystal layer 20. Pixel electrode 22 and second alignment film 25 are disposed on the side of the liquid crystal layer 20 of the second substrate 19. Further, protrusions 36 for controlling alignment are disposed on the first alignment film 24 on the side where the common electrode 21 is disposed and on the side close to the liquid crystal layer 20 of the first alignment film 24. Black matrixes 37 are disposed on the second alignment film 25 on the side where the second substrate 19 is disposed and on the side close to the liquid crystal layer 20 of the second alignment film 25 in parts corresponding to the protrusions 36.

The protrusions for controlling alignment are disposed in the vicinity of the middle of the pixel, although since the liquid crystal displays of the VA system of the embodiment can obtain effects in all respects, the electrode slit structure, for example, may be used to control alignment of liquid crystal molecules.

FIG. 19 is a plan view showing one pixel on the first substrate 18 of FIG. 18.

The sub-pixel A of the common electrode 21 shown in FIG. 19 is formed into an allover electrode (electrode having all the aperture in the sub-pixel covered by the electrode) and the sub-pixel B is formed into an inter-digital electrode (electrode having spaces formed at regular intervals). The common electrode 21 as shown in FIG. 19 is used to produce a difference in retardation upon application of voltage in the sub-pixels A and B. This effects can be attained by setting the ratio of the common electrode 21 occupying the aperture in the sub-pixel A to be 100% and setting the ratio of the common electrode 21 occupying the aperture in the sub-pixel B to be equal to or larger than 0% and smaller than 100%. At this time, even if the ratio of the pixel electrode 22 is changed instead of the common electrode 21, the same effects can be attained. The shape of the common electrode 21 in the sub-pixel B is not limited to the inter-digital shape but it may be mesh, for example.

FIG. 20 is a plan view showing one pixel on the second substrate 19 of FIG. 18.

Black matrixes 37 are disposed in the vicinity of the middles of the sub-pixels A and B in a corresponding manner to the protrusions 36 for controlling alignment.

Figure 24:
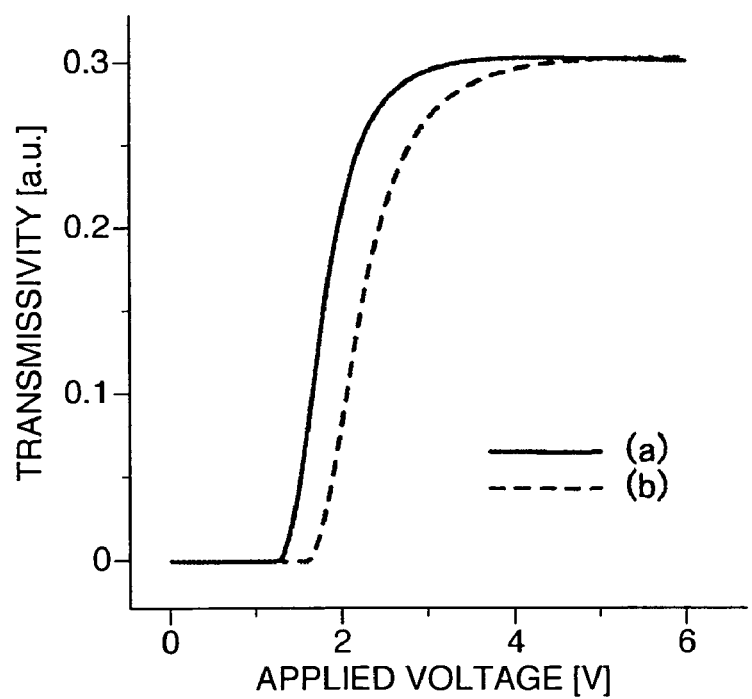
FIG. 24 is a graph explaining voltage-to-transmissivity characteristics of an embodiment 7 of the present invention.

FIG. 24 shows theoretically calculated results of the voltage-to-transmissivity characteristics in the structure of the embodiment. (a) of FIG. 24 represents the result in case where the embodiment is adopted and the ratio of the common electrode 21 occupying the aperture is set to 50% as an example. (b) of FIG. 24 represents the result in case where the conventional electrode structure (the ratio of the common electrode 21 occupying the aperture is 100%) is used.

When the result represented by (a) of FIG. 24 is compared with the result represented by (b) of FIG. 24, the voltage in case where the transmissivity is 50% of a maximum value is about 3.0 V for the former case and it is about 3.7 V for the latter case. It is understood from the relation of the results represented by (a) and (b) of FIG. 24 that different electro-optical characteristics in the sub-pixels A and B can be attained by the structure of the embodiment.

Figure 25A:
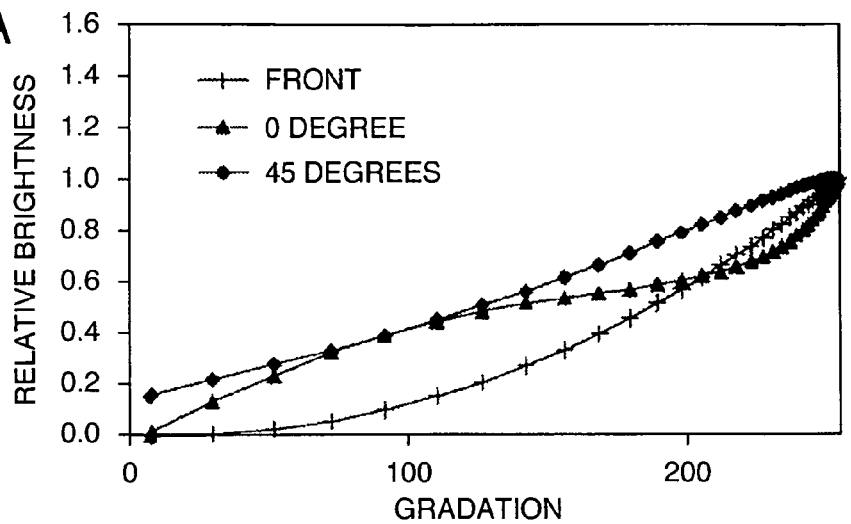
FIGS. 25A, 25B and 25C are graphs showing $\gamma$ characteristics of the liquid crystal display of the embodiment 7 of the present invention.
Figure 25B:
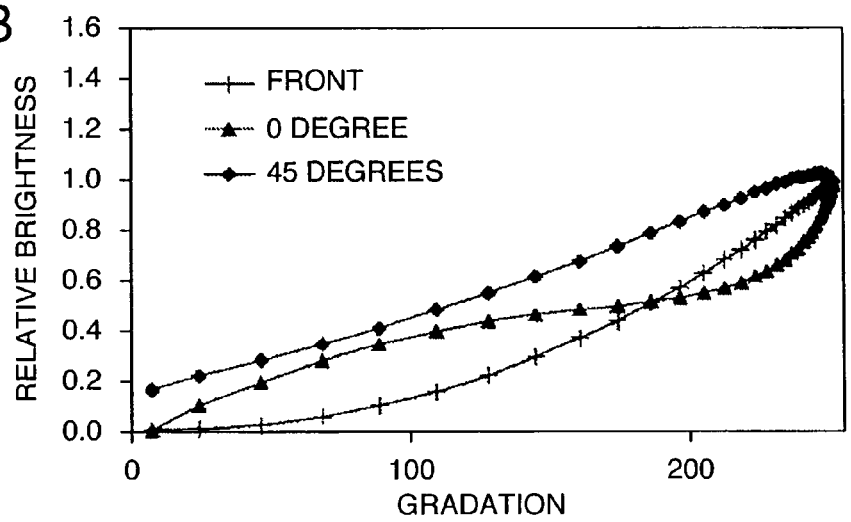
Figure 25C:
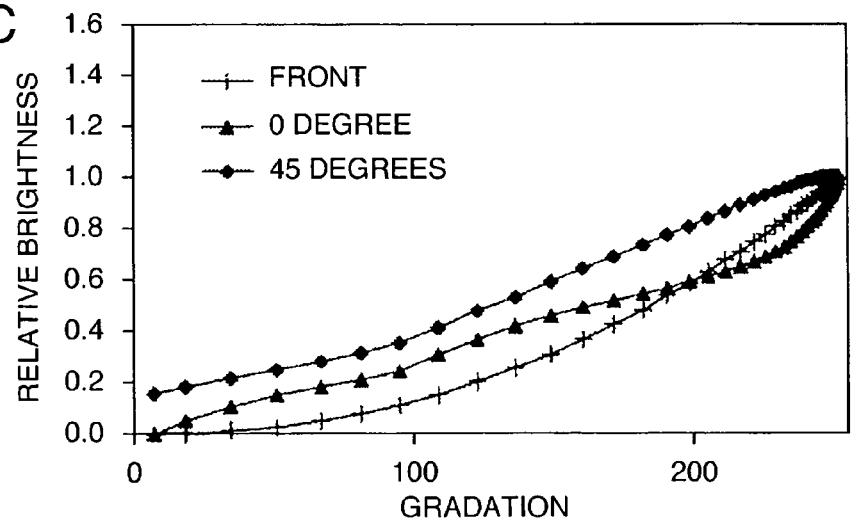

FIGS. 25A, 25B and 25C are graphs showing gradation-to-relative brightness characteristics, that is, so-called γ characteristics on every condition.

FIG. 25A shows the γ characteristic on the condition for (a) of FIG. 24, FIG. 25B shows the γ characteristic on the condition for (b) of FIG. 24, and FIG. 25C shows the γ characteristic on the condition that the structure of the embodiment is used and the conditions for (a) and (b) of FIG. 24 are used for the sub-pixels A and B, respectively. The γ characteristics were measured on three conditions including the condition that observation was made from the front of the substrate, the condition that observation was made from the direction that is parallel to the absorption axis of the first polarization plate 11 and inclined at the angle of 60 degrees to the normal-line direction of the substrate and the condition that observation was made from the direction rotated by 45 degrees clockwise from the absorption axis of the first polarization plate 11 and inclined at the angle of 60 degrees to the normal-line direction of the substrate. The γ shift is reduced in FIG. 25C as compared with FIGS. 25A and 25B.

As described above, in the embodiment, the ratio of the common electrode 21 occupying the aperture is set to be equal to or larger than 0% and smaller than 100% to improve shift in the γ characteristics when observation is made from the front and when observation is made from the inclined direction.

Embodiment 8

Description of the embodiment is directed to the liquid crystal display of the VA system having two sub-pixels in one pixel and using a circular polarization plate instead of the ordinary polarization plate, wherein the ratios of the common electrode 21, the pixel electrode 22 or both of them occupying the aperture in one sub-pixel and in the other sub-pixel are different from each other and the ratio of the common electrode 21, the pixel electrode 22 or both of them occupying the aperture in one sub-pixel is equal to or larger than 0% and smaller than 100%.

The liquid crystal display of the VA system using the circular polarization plate can reduce shift in the γ characteristics when observation is made from the front and when observation is made from the inclined direction.

The embodiment is different from the embodiment 7 in that the structure of the retardation film is changed. The transmissive liquid crystal display of the embodiment has the same structure as that of the liquid crystal display shown in FIG. 1.

The transmissive liquid crystal display of the VA system using the circular polarization plate instead of the ordinary polarization plate can reduce shift in the γ characteristics when observation is made from the front and when observation is made from the inclined direction in the same manner as the embodiment 7. Even the transflective liquid crystal display using the circular polarization plate instead of the ordinary polarization plate can attain the same effects.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A liquid crystal display including a plurality of pixels, comprising:
   a first substrate;
   a second substrate;
   a liquid crystal layer disposed between the first and second substrates;
   a first polarization plate disposed on the side opposite to the side where the liquid crystal layer is disposed with respect to the first substrate; and
   a second polarization plate disposed on the side opposite to the side where the liquid crystal layer is disposed with respect to the second substrate;
   wherein the second substrate includes a pixel electrode on the side of the liquid crystal layer;
   wherein the first substrate includes a common electrode on the side of the liquid crystal layer;
   wherein each of the plurality of pixels includes a reflection area and a transmission area;
   wherein a ratio of the common electrode occupying the aperture in the reflection area is smaller than a ratio of the common electrode occupying the aperture of the transmission area;
   wherein a ratio of the pixel electrode occupying the aperture in the reflection area is smaller than a ratio of the pixel electrode occupying the aperture of the transmission area; and wherein the ratio of the common electrode and the pixel electrode occupying the aperture in the transmission area is 100%.

2. A liquid crystal display according to claim 1, wherein the liquid crystal layer includes liquid crystal molecules having the major axes which are aligned substantially vertically to the first and second substrates when voltage is not applied.

3. A liquid crystal display according to claim 1, wherein the liquid crystal layer includes liquid crystal molecules having the major axes which are aligned substantially horizontally to the first and second substrates when voltage is not applied, and
- a pre-tilt angle of the liquid crystal layer is equal to or larger than 0 degree and smaller than 10 degrees, and
- a twist angle of the liquid crystal molecules between the first and second substrates being equal to or larger than 0 degree and smaller than 90 degrees.

4. A liquid crystal display according to claim 1, further comprising signal lines and scanning lines disposed on the second substrate and thin film transistors disposed at places where the signal lines and the scanning lines intersect each other.

5. A liquid crystal display according to claim 1, further comprising a color filter disposed on the side where the liquid crystal layer is disposed with respect to the first substrate.

6. A liquid crystal display according to claim 1, wherein the first substrate or the second substrate or both of them are comprised of one of glass, plastic, and polyether sulphone.

7. A liquid crystal display according to claim 1, further comprising one or more retardation films disposed between the first substrate and the first polarization plate and between the second substrate and the second polarization plate.

8. A liquid crystal display according to claim 7, wherein the retardation films have a phase difference of ¼ wavelength.

9. A liquid crystal display according to claim 7, wherein the retardation films includes a first retardation film having a phase difference of ¼ wavelength and a second retardation film having ½ wavelength, and
- the first retardation film is disposed between the liquid crystal layer and the second retardation film,
- the second retardation film being disposed between the first polarization plate or the second polarization plate and the first retardation film.

10. A liquid crystal display according to claim 7, wherein the retardation films include a negative C-plate.

11. A liquid crystal display according to claim 1, further comprising a reflecting plate disposed in the reflection area and
- an insulating layer disposed between the common electrode or the pixel electrode and the reflecting plate.

12. A liquid crystal display according to claim 11, wherein the reflecting plate is made of nonconductive material.

13. A liquid crystal display according to claim 1, wherein at least one of the pixel electrode and the common electrode in the reflection area comprises an inter-digital electrode.

14. A liquid crystal display according to claim 1, wherein at least one of the pixel electrode and the common electrode in the reflection area comprises an inter-digital electrode, and
- comprising one or more slits disposed substantially parallel to the longitudinal direction of the inter-digital electrode.

15. A liquid crystal display according to claim 1,
wherein the ratio of the common electrode and the pixel electrode occupying the aperture in the reflection area is equal to or larger than 40% and smaller than 60%.

16. A liquid crystal display according to claim 6, wherein at least one of a plastic and a polyether sulphone substrate is covered with a surface comprising silicon nitride.

* * * * *